United States Patent
Kurashige et al.

(10) Patent No.: US 9,454,014 B2
(45) Date of Patent: Sep. 27, 2016

(54) ILLUMINATION DEVICE, PROJECTION APPARATUS AND PROJECTION-TYPE IMAGE DISPLAY APPARATUS

(75) Inventors: Makio Kurashige, Kashiwa (JP); Kazutoshi Ishida, Saitama (JP); Tomoe Takanokura, Katsushika-ku (JP); Yasuyuki Ooyagi, Funabashi (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 638 days.

(21) Appl. No.: 13/821,707

(22) PCT Filed: Sep. 8, 2011

(86) PCT No.: PCT/JP2011/070521
§ 371 (c)(1),
(2), (4) Date: Mar. 8, 2013

(87) PCT Pub. No.: WO2012/033175
PCT Pub. Date: Mar. 15, 2012

(65) Prior Publication Data
US 2013/0170006 A1   Jul. 4, 2013

(30) Foreign Application Priority Data
Sep. 8, 2010 (JP) ................ 2010-201335

(51) Int. Cl.
*G03H 1/22* (2006.01)
*G02B 27/48* (2006.01)
(Continued)

(52) U.S. Cl.
CPC ............ *G02B 27/48* (2013.01); *G02B 5/0252* (2013.01); *G03B 21/2033* (2013.01);
(Continued)

(58) Field of Classification Search
CPC ...... G02B 5/32; G02B 26/101; G02B 27/48; G03B 21/2033; G03B 21/208; G03H 1/22; G03H 1/32; G03H 1/2286; H04N 9/3129; H04N 9/3147
See application file for complete search history.

(56) References Cited

U.S. PATENT DOCUMENTS

| | | |
|---|---|---|
| 5,313,479 A | 5/1994 | Florence |
| 8,238,006 B2 * | 8/2012 | Kim ........................... 359/17 |

(Continued)

FOREIGN PATENT DOCUMENTS

| | | |
|---|---|---|
| JP | 06-208089 A1 | 7/1994 |
| JP | 2000-019641 A1 | 1/2000 |

(Continued)

OTHER PUBLICATIONS

Japanese Office Action (With English Translation), Japanese Application No. 2012-533028, dated Jul. 3, 2015 (10 pages).
(Continued)

*Primary Examiner* — Jennifer L. Doak
(74) *Attorney, Agent, or Firm* — Burr & Brown, PLLC

(57) ABSTRACT

An illumination device has an optical device and an irradiation unit. The irradiation unit has a light source emitting a coherent light beam, and a scanning device capable of adjusting a reflection angle of the coherent light beam emitted from the light source. The light source has light sources emitting a plurality of coherent light beams having an identical wavelength range, the hologram recording medium has a recording area to be scanned with each of a plurality of coherent light beams reflected by the scanning device, and the recording area has an interference fringe that diffracts an incident coherent light beam. The optical device uses the plurality of coherent light beams diffracted by the interference fringe of the recording area so that each of the coherent light beams diffracted by the hologram recording medium is superimposed on at least one portion to reproduce the image of the reference member.

12 Claims, 11 Drawing Sheets

(51) Int. Cl.

| | | |
|---|---|---|
| *G02B 5/02* | (2006.01) | |
| *G03B 21/20* | (2006.01) | |
| *G03B 33/06* | (2006.01) | |
| *G03H 1/32* | (2006.01) | |
| *H04N 9/31* | (2006.01) | |
| *G02F 1/1335* | (2006.01) | |
| *G03H 1/00* | (2006.01) | |

(52) U.S. Cl.
CPC .............. *G03B 33/06* (2013.01); *G03H 1/22* (2013.01); *G03H 1/2286* (2013.01); *G03H 1/32* (2013.01); *H04N 9/3129* (2013.01); *H04N 9/3161* (2013.01); *G02F 1/133611* (2013.01); *G02F 2203/12* (2013.01); *G02F 2203/24* (2013.01); *G03H 1/0005* (2013.01); *G03H 2001/2271* (2013.01); *G03H 2222/18* (2013.01); *G03H 2222/36* (2013.01)

(56) References Cited

U.S. PATENT DOCUMENTS

| | | |
|---|---|---|
| 2002/0015306 A1 | 2/2002 | Yamamoto |
| 2008/0247022 A1 | 10/2008 | Yamauchi et al. |
| 2008/0309996 A1* | 12/2008 | Cowan .............................. 359/3 |
| 2009/0102988 A1* | 4/2009 | Maeda ............... G03B 21/2033 348/756 |
| 2009/0168424 A1 | 7/2009 | Yamauchi et al. |
| 2010/0020291 A1 | 1/2010 | Kasazumi et al. |
| 2010/0053565 A1 | 3/2010 | Mizushima et al. |

FOREIGN PATENT DOCUMENTS

| | | |
|---|---|---|
| JP | 2002-040360 A1 | 2/2002 |
| JP | 2004-264512 A1 | 9/2004 |
| JP | 2007-148220 A1 | 6/2007 |
| JP | 2008-026591 A1 | 2/2008 |
| JP | 2008-212444 A1 | 9/2008 |
| JP | 2008-256824 A1 | 10/2008 |
| JP | 2009-163901 A1 | 7/2009 |
| JP | 2009-186647 A1 | 8/2009 |
| WO | 01/081996 A1 | 11/2001 |
| WO | 2006/137326 A1 | 12/2006 |
| WO | 2008/114502 A1 | 9/2008 |

OTHER PUBLICATIONS

Joseph W. Goodman, "Speckle Phenomena In Optics Theory and Applications," Chapter 6, Speckle in Certain Imaging Applications, Roberts & Co., 2006, pp. 187-233.

International Search Report dated Oct. 11, 2011 (with English translation).

International Preliminary Report on Patentability dated Nov. 1, 2012.

* cited by examiner

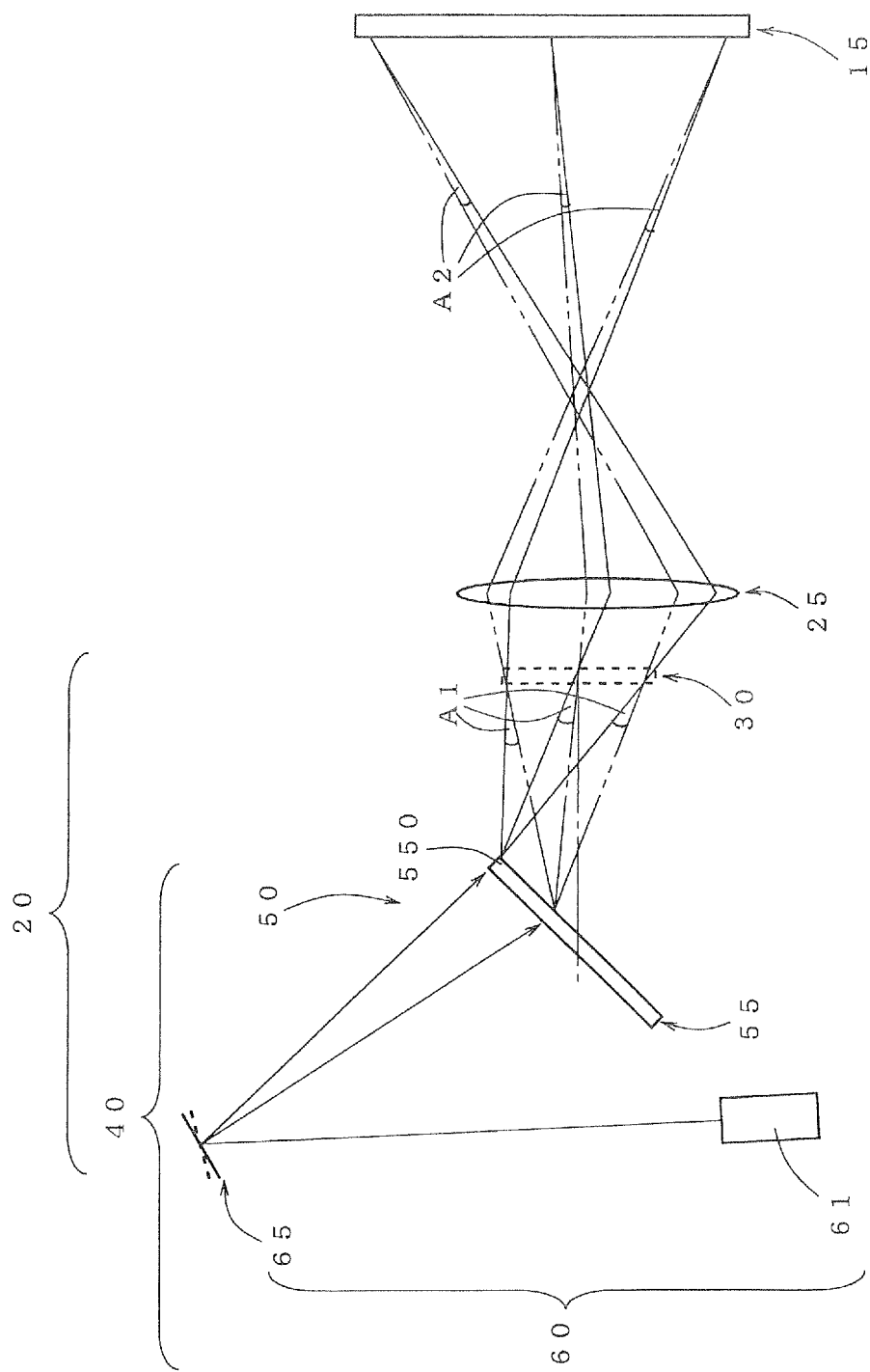
F I G. 2

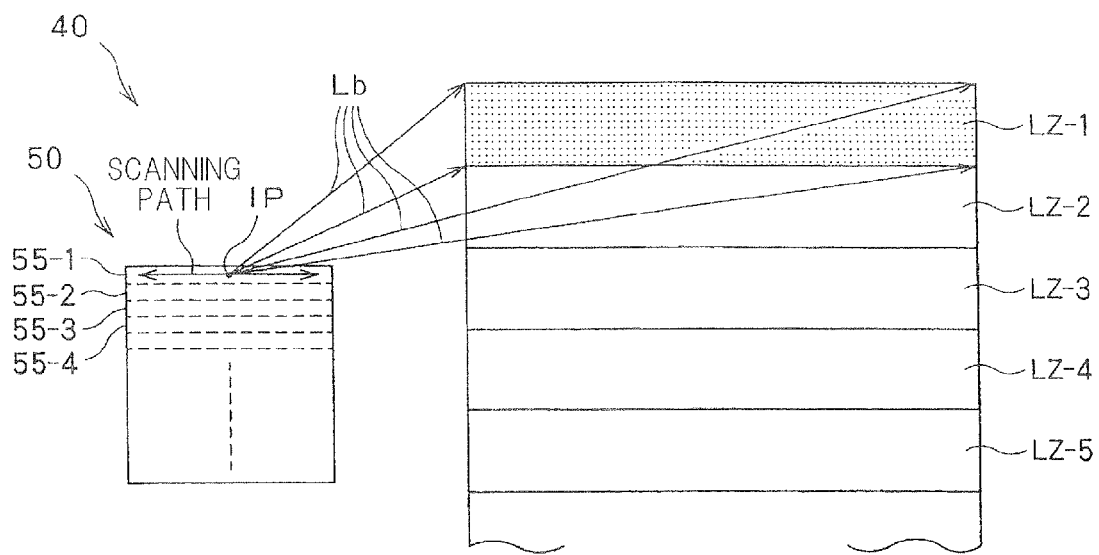
F I G. 10
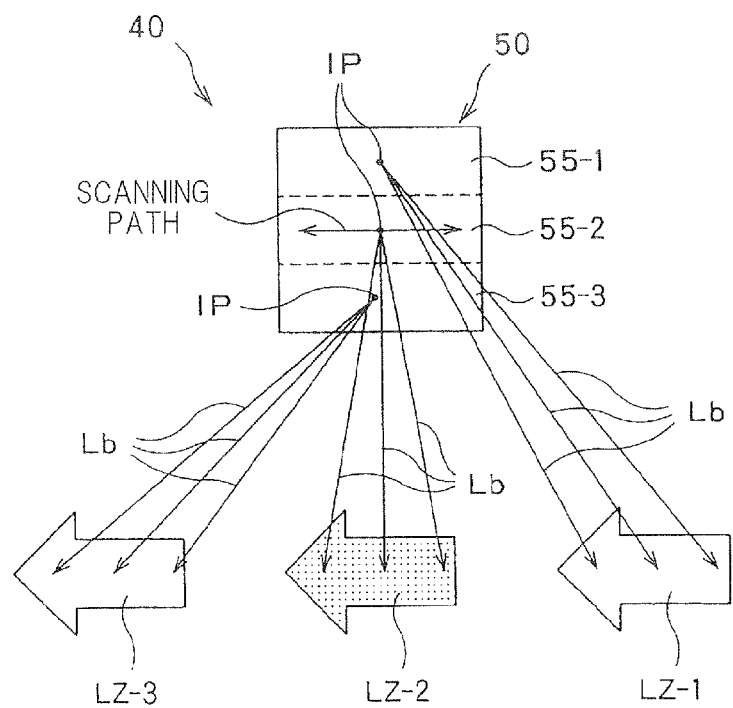
F I G. 11

ILLUMINATION DEVICE, PROJECTION APPARATUS AND PROJECTION-TYPE IMAGE DISPLAY APPARATUS

BACKGROUND OF THE INVENTION

1. Field of the Invention

The present invention relates to an illumination device for illuminating a region repeatedly with coherent light beams that are diffracted by a hologram recording medium or the like, a projection apparatus for projecting coherent light beams, and a projection-type image display apparatus for displaying images using coherent light beams, and more particularly, to an illumination device, a projection apparatus and a projection-type image display apparatus capable of making speckles inconspicuous.

2. Description of Related Art

Projection-type image display apparatuses having a screen and a projection apparatus which projects light beams of an image onto the screen have been widely used. In a typical projection-type image display apparatus, a two-dimensional image is created as a basic image using a spatial light modulator such as a liquid crystal microdisplay or a DMD (Digital Micromirror Device), and then the two-dimensional image is magnified and projected onto a screen using a projection optical system, so that an image is displayed on the screen.

As projection apparatuses, various types including a commercialized product called an "optical projector" have been proposed. In general optical projectors, a spatial light modulator such as a liquid crystal display is illuminated using an illumination device having a white light source such as a high pressure mercury lamp to obtain a modulated image, and the obtained modulated image is magnified and projected onto a screen through lenses. For example, Japanese Patent Laid-Open No. 2004-264512 discloses a technique to divide white light generated by a super-high pressure mercury lamp into three primary color components R, G, and B with a dichroic mirror, guide these light beams to spatial light modulators corresponding to the respective primary colors to create modulated images, and combine the created modulated images corresponding to the respective primary colors by a cross dichroic prism, to project the images onto a screen.

However, high intensity discharge lamps such as high pressure mercury lamps have a short lifecycle and when they are used for optical projectors or the like, they need to be frequently replaced. In addition, since a relatively large optical system such as a dichroic mirror is needed to extract light beams of the respective primary color components, there is a problem in that the entire system becomes larger.

In order to cope with such problems, a system using a coherent light source such as a laser has also been proposed. For example, semiconductor lasers which have been widely used in industries have a very long lifecycle in comparison with high intensity discharge lamps such as high pressure mercury lamps. In addition, since semiconductor lasers are capable of generating light of a single wavelength, a spectroscopic apparatus such as a dichroic mirror is unnecessary, thereby downsizing the entire system.

On the other hand, in the system using a coherent light source of laser beams or the like, there is another problem in that speckles are generated. Speckles are a spotted pattern formed when a coherent light beam such as a laser beam is emitted to a scattering plane. If speckles are generated on a screen, they are observed as spotted luminance unevenness, i.e. brightness unevenness, thus becoming a factor of having physiologically adverse affect on an observer. It is considered that the reason why speckles are generated in the case of using coherent light beams is that coherent light beams reflected from respective portions of a scattering and reflecting plane such as a screen have very high coherency so that coherent light beams interfere with one another to generate speckles. For example, a theoretical review of the generation of speckles is made in detail in Speckle Phenomena in Optics, Joseph W. Goodman, Roberts & Co., 2006.

As discussed above, in the system using a coherent light source, since there is a problem in that speckles are generated due to the coherent light source, techniques for suppressing the generation of speckles have been proposed. For example, Japanese Patent Laid-Open No. 6-208089 discloses a technique in which a laser beam is emitted to a scattering plate, scattered light beams obtained therefrom are guided to a spatial light modulator, and the scattering plate is driven to rotate by a motor, thus reducing speckles.

SUMMARY OF THE INVENTION

As described above, with respect to projection apparatuses and projection-type image display apparatuses using a coherent light source, techniques for reducing speckles have been proposed, however, the techniques proposed so far cannot effectively and sufficiently suppress the generation of speckles. For example, according to the method disclosed in Japanese Patent Laid-Open No. 6-208089 described above, laser beams irradiated to a scattering plate are scattered. Therefore, part of the laser beams is inevitably lost with no contribution to image display. In addition, a scattering plate needs to be rotated in order to reduce speckles. However, such a mechanical rotation mechanism becomes a relatively large apparatus, and power consumption is increased. Moreover, even if the scattering plate is rotated, the position of the optical axis of an illumination light beam is not changed, hence it is impossible to sufficiently suppress the generation of speckles caused by the diffusion on a screen.

Moreover, speckles are not a problem unique to projection apparatuses, projection-type image display apparatuses and the like but a problem to various apparatuses having an illumination device incorporated therein for illuminating an illumination zone with coherent light beams. For example, scanners for reading image information have an illumination device incorporated therein for illuminating an object to be read. When speckles are generated due to light that illuminates an object to be read, it is impossible to read image information accurately. In order to avoid such inconvenience, scanners utilizing coherent light beams are required to perform a special process such as image correction.

Coherent light beams such as laser beams as a typical example, exhibit excellent straightness and can emit a light of extremely high energy density. Therefore, illumination devices actually developed are preferable to design the optical path of coherent light beams in accordance with the characteristics of coherent light beams.

The inventors have extensively researched under consideration of the points discussed above, and as a result, the inventors have contrived the invention regarding an illumination device which illuminates a region repeatedly with coherent light beams diffracted by a hologram recording medium or the like, and can make speckles inconspicuous. Moreover, the inventors have proceeded with researches and succeeded in improvement in the illumination device to constantly prevent the generation of a region extremely bright in the region illuminated with coherent light beams which have been diffracted by a hologram recording medium and superimposed one another on the region. Namely, the purpose of the present invention is to provide an illumination device capable of making speckles inconspicuous and effectively suppressing the generation of brightness unevenness in a region illuminated with coherent light beams which have been diffracted by a hologram recording medium and superimposed one another on the region, and a projection apparatus and a projection-type image display apparatus that include the illumination device.

In order to solve the problems above, according to an aspect of the present invention, there is provided a first illumination device comprising:

an illumination device comprising: a first optical device including a hologram recording medium capable of reproducing an image of a reference member; and an irradiation unit configured to irradiate a coherent light beam to the optical device so that the coherent light beam scans the hologram recording medium, wherein the irradiation unit comprises:

a light source configured to emit a coherent light beam; and a scanning device configured to be capable of adjusting a reflection angle of the coherent light beam emitted from the light source and to make a reflected coherent light beam scan on the hologram recording medium, wherein the light source comprises a plurality of light sources configured to emit a plurality of coherent light beams having an identical wavelength range, the hologram recording medium comprises a recording area to be scanned with each of a plurality of coherent light beams reflected by the scanning device, and the recording area comprises an interference fringe that diffract an incident coherent light beam, wherein the optical device uses the plurality of coherent light beams diffracted by the interference fringe of the recording area so that each of the coherent light beams diffracted by the hologram recording medium is superimposed on at least one portion to reproduce the image of the reference member.

According to the present invention, it is possible to effectively make speckles inconspicuous in a region or on an image projection surface superimposingly illuminated with coherent light beams diffracted by a hologram recording medium or the like and effectively suppress the generation of unevenness of brightness and color in the region or on the image projection surface, and also to improve the illumination intensity in the regions.

According to an aspect of the present invention, there is provided a first projection apparatus comprising:

a first illumination device; and a spatial light modulator that is provided at a location overlapped with the one portion reproducing the image of the reference member and illuminated by the illumination device.

According to an aspect of the present invention, there is provided a projection-type image display apparatus comprising:

a projection apparatus; and a screen that projects a modulated image generated in the spatial light modulator.

According to an aspect of the present invention, there is provided a second illumination device comprising:

an optical device comprising a lens array that changes a propagation direction of an incident light beam; and an irradiation unit configured to irradiate the optical device with a coherent light beams so that the coherent light scans the lens array, wherein the irradiation unit comprises:

a light source configured to emit a coherent light beam; and a scanning device configured to be capable of adjusting a reflection angle of the coherent light beam and to make a reflected coherent light beam scan the lens array, wherein the light source comprises a plurality of light sources configured to emit a plurality of coherent light beams having an identical wavelength range, and the lens array refracts a plurality of coherent light beams reflected by the scanning device so that coherent light beams incident on respective positions of the lens array from the irradiation unit are diffracted by the lens array to reproduce an image superimposed on at least one portion.

According to an aspect of the present invention, there is provided a second projection apparatus comprising:

a second illumination device; and a spatial light modulator that is provided at a location overlapped with the one portion and illuminated by the illumination device.

According to an aspect of the present invention, there is provided a projection-type image display apparatus comprising:

a second projection apparatus; and a screen onto which a modulated image obtained on the spatial light modulator is projected.

BRIEF DESCRIPTION OF DRAWINGS

FIG. 2 is a view explaining the operational principle of an illumination device 40 of FIG. 1;

FIG. 10 is a view explaining one modification of an optical device, that is a plan view showing an optical device with the corresponding illumination zones;

FIG. 11 is a view explaining another modification of the optical device, that is a plan view showing an optical device with the corresponding illumination zones;

DETAILED DESCRIPTION OF THE INVENTION

Hereinafter, embodiments of the present invention will be explained with reference to the drawings. In the accompanying drawings of the present description, in order to simplify drawings and make easy understanding, the scale, the ratio of height to width, etc., are appropriately modified or enlarged.

An illumination device, a projection apparatus, and a projection-type image display apparatus according to an embodiment of the present invention have a configuration capable of effectively preventing the generation of speckles, as a basic configuration. Moreover, an illumination device, a projection apparatus, and a projection-type image display apparatus according to an embodiment of the present invention have a configuration as being added to the basic configuration capable of effectively preventing the generation of speckles, capable of stably achieving high quality and being safely used, by designing optical paths of coherent light beams in consideration of on the characteristics of coherent light beams such as high coherency and high energy density.

In the following description, by referring to an illumination device and a projection-type image display apparatus exemplified in FIGS. 1 to 5, a configuration for making speckles inconspicuous, advantageous effects based on the configuration, and a modification of the configuration will be explained as a basic embodiment. Subsequently, a configuration that can be added to the basic embodiment, capable of stably achieving high quality and being safely used, advantageous effects based on the configuration, and a modification of the configuration will be explained as an additional embodiment.

<Basic Embodiment>
[Configuration of Basic Embodiment]

Firstly, a configuration of a projection-type image display apparatus including an illumination device and a projection apparatus for projecting coherent light beams and capable of making speckles inconspicuous will be explained referring mainly to FIGS. 1 to 5.

Figure 1:
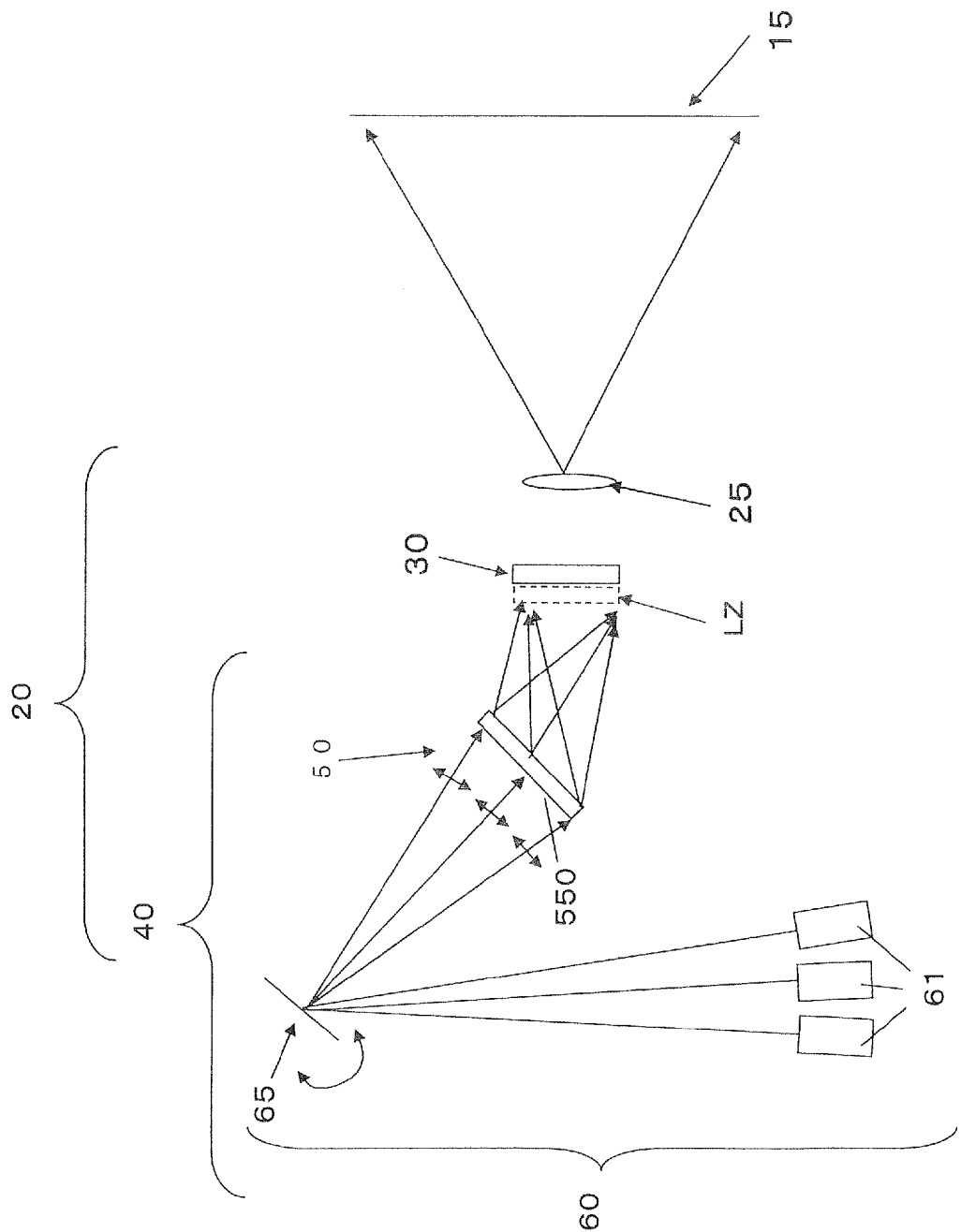
FIG. 1 is a view showing a schematic configuration of a projection-type image display apparatus.

A projection-type image display apparatus 10 shown in FIG. 1 is provided with a screen 15 and a projection apparatus 20 for projecting an image light generated by coherent light beams. The projection apparatus 20 is provided with an illumination device 40 for illuminating an illumination zone LZ located on a virtual plane with coherent light beams, a spatial light modulator 30 that is provided on the location overlapping with the illumination zone LZ and is illuminated with coherent light beams by the illumination device 40, and a projection optical system 25 for projecting coherent light beams from the spatial light modulator 30 onto the screen 15.

As the spatial light modulator 30, for example, a transmission-type liquid crystal microdisplay can be used. In this case, the spatial light modulator 30 is illuminated by the illumination device 40 in the plane direction and coherent light beams pass through the spatial light modulator 30 selectively per pixel. In this way, the spatial light modulator 30 generates a modulated image on a display. The generated modulated image, i.e. an image light is varied its size by the projection optical system 25 and projected onto the screen 15. In this way, a modulated image is displayed on the screen 15 with a varied size, i.e. usually, magnified, so that an observer can observe the image.

As the spatial light modulator 30, a reflection-type microdisplay can also be used. In this case, a modulated image is generated by reflected light beams at the spatial light modulator 30 so that a plane on the spatial light modulator 30 illuminated with coherent light beams from the illumination device 40 and an emitting plane for light beams of an image, i.e. reflected light beams, of a modulated image generated by the spatial light modulator 30 become the same plane. When utilizing such reflected light beams, it is possible to use a MEMS (Micro Electro Mechanical Systems) device such as a DMD (Digital Micromirror Device) as the spatial light modulator 30. In the apparatus disclosed in Japanese Patent Laid-Open No. 6-208089, a DMD is used as the spatial light modulator.

Moreover, it is preferable that the incidence plane of the spatial light modulator 30 has the same shape and size as the illumination zone LZ that is illuminated with coherent light beams by the illumination device 40. The reason is that coherent light beams from the illumination device 40 can be used for displaying an image on the screen 15 at high utilization efficiency.

The screen 15 may be a transmission-type screen or a reflection-type screen. In the case where the screen 15 is a reflection-type screen, an observer observes an image created by coherent light beams reflected on the screen 15 at the same side as the projection apparatus with respect to the screen 15. On the other hand, in the case where the screen 15 is a transmission-type screen, an observer observes an image created by coherent light beams that have passed through the screen 15 at the opposite side of the projection apparatus with respect to the screen 15.

Coherent light beams projected onto the screen 15 are diffused and recognized by an observer as an image. In this case, the coherent light beams projected onto the screen interfere with one another due to the diffusion, thus generating speckles. However, in the projection-type image display apparatus 10 which is described here, the illumination device 40 which will be described later has a configuration in which the illumination zone LZ overlapped with the spatial light modulator 25 is illuminated with coherent light beams that changes angle with time. In more specifically, the illumination device 40 described later has a feature in that, while the entire region of the illumination zone LZ is illuminated with diffused light of coherent light beams, the incident angle of diffused light on the illumination zone LZ varies with time. This results in that a diffusion pattern of coherent light beams on the screen 15 also varies with time, so that speckles caused by the diffusion of the coherent light beams become inconspicuous as they are superimposed one another with time. Hereinafter, the illumination device 40 described above will be explained more in detail.

FIG. 2 is a view explaining the operational principle of the illumination device 40 of FIG. 1. In FIG. 2, in order to simplify explanation, only a part of components in the illumination device 40 is shown. Hereinafter, the basic operational principle of the illumination device 40 of FIG. 1 will be explained using FIG. 2.

The illumination device 40 according to the present embodiment is provided with an optical device 50 that directs a propagation direction of coherent light beams to the illumination zone LZ and an irradiation unit 60 that irradiates the optical device 50 with coherent light beams. The optical device 50 includes a hologram recording medium 55 that can reproduce an image of a scattering plate not shown.

The hologram recording medium 55 can receive coherent light beams irradiated from the irradiation unit 60 as reproduction illumination light beams La (see FIG. 4) and diffract the coherent light beams at high efficiency. Above all, the hologram recording medium 55 is configured to be capable of reproducing an image of a scattering plate by diffracting coherent light beams incident on its respective positions, in other words, respective micro zones which should be called respective points.

The irradiation unit 60 is configured so that the optical device 50 uses coherent light beams irradiated on the hologram recording medium 55 to scan the hologram recording medium 55. Therefore, a zone on the hologram recording medium 55 illuminated with coherent light beams by the irradiation unit 60 at a moment is a portion of the surface of the hologram recording medium 55, i.e. in the example shown, a micro zone which should be called a point.

Coherent light beams irradiated from the irradiation unit 60 to scan the hologram recording medium 55 are incident on respective positions, i.e. respective points or respective zones on the hologram recording medium 55 at an incident angle that satisfies diffraction requirements of the hologram recording medium 55. Coherent light beams incident on respective positions of the hologram recording medium 55 from the irradiation unit 60 are diffracted by the hologram recording medium 55 to illuminate the zones that are overlapped with one another at least partially. Above all in the embodiment described here, coherent light beams incident on respective positions of the hologram recording medium 55 from the irradiation unit 60 are diffracted by the hologram recording medium 55 to illuminate the same illumination zone LZ. In more detail, as shown in FIG. 2, the coherent light beams incident on respective positions of the hologram recording medium 55 from the irradiation unit 60 reproduce an image of a scattering plate in a manner that the image is superimposed on the illumination zone LZ. Namely, each coherent light beam incident on each position of the hologram recording medium 55 from the irradiation unit 60 is diffused, i.e. spread by the optical device 50 to be incident on the illumination zone LZ.

Figure 3:
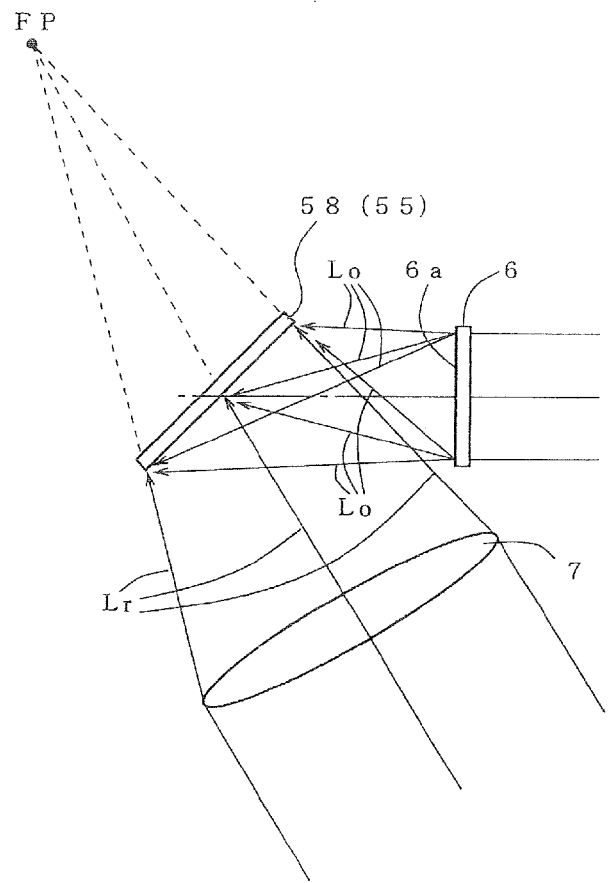
FIG. 3 is a view explaining a state in which an image of a scattering plate is formed on a hologram recording medium 55 as interference fringes.

As for the hologram recording medium 55 that enables the diffraction of coherent light beams described above, in the example shown, a transmission-type volume hologram using photopolymer is used. FIG. 3 is a view explaining a state in which an image of a scattering plate 6 is generated on the hologram recording medium 55 as interference fringes. Here, the scattering plate 6 is a reference member and it does not matter what a configuration the scattering plate 6 has.

As shown in FIG. 3, the hologram recording medium 55 is produced using scattered light beams from an actual scattering plate 6 as object beams Lo. FIG. 3 shows a state in which a hologram photosensitive material 58 having photosensitivity suitable for the hologram recording medium 55 is exposed by reference beams Lr and object beams Lo, both of which have coherency to each other.

As for the reference beams Lr, for example, laser beams from a laser source that oscillates laser beams in a specific wavelength range are used. The reference beams Lr pass through a condenser element 7 made of a lens and are incident on the hologram photosensitive material 58. In the example shown in FIG. 3, laser beams corresponding to the reference beams Lr are incident on the condenser element 7 as a parallel light flux that is parallel with the optical axis of the condenser element 7. By passing through the condenser element 7, the reference beams Lr are reshaped, i.e. converted, from a parallel light flux into a convergent light flux and incident on the hologram photosensitive material 58. On this occasion, a focal point FP of the convergent light flux Lr is located at a position beyond the hologram photosensitive material 58. In other words, the hologram photosensitive material 58 is located between the condenser element 7 and the focal point FP of the convergent light flux Lr collected by the condenser element 7.

Next, the object beams Lo are incident on the hologram photosensitive material 58 as scattered light from the scattering plate 6 made of opal glass, for example. In the example shown in FIG. 3, the hologram recording medium 55 to be produced is a transmission type and the object beams Lo are incident on the hologram photosensitive material 58 on the same side as the reference beams Lr. It is a precondition that the object beams Lo are coherent with the reference beams Lr. Therefore, for example, it is possible to separate laser beams oscillated by the same single laser source and use one of the separated ones as the reference beams Lr and the other as the object beams Lo.

In the example shown in FIG. 3, a parallel light flux that is parallel with the direction of normal to the plate surface of the scattering plate 6 is incident on the scattering plate 6 and scattered, and then the scatted beams that have passed through the scattering plate 6 are incident on the hologram photosensitive material 58 as the object beams Lo. According to this method, when an isotropic scattering plate available at low cost can be used as the scattering plate 6, the object beams Lo can be easily incident on the hologram photosensitive material 58 at roughly constant intensity distribution. Moreover, according to this method, although depending on the degree of scattering by the scattering plate 6, the reference beams Lr can be easily incident on respective positions of the hologram photosensitive material 58 at roughly constant intensity from the entire region of a light-emitting surface 6a of the scattering plate 6. In such a case, it is achievable that light beams incident on respective positions of the obtained hologram recording medium 55 reproduce images 5 of the scattering plate 6 at similar brightness and reproduced images 5 of the scattering plate 6 are observed at roughly constant brightness.

As described above, when the hologram photosensitive material 58 is exposed by the reference beams Lr and object beams Lo, interference fringes caused by the interference between the reference beams Lr and object beams Lo are generated and interference fringes of these light beams are recorded in the hologram photosensitive material 58 as some form of pattern, i.e. an refractive index modulation pattern, as one example in a volume hologram. Thereafter, an appropriate posttreatment corresponding to the type of the hologram photosensitive material 58 is applied, thereby obtaining the hologram recording medium 55.

Figure 4:
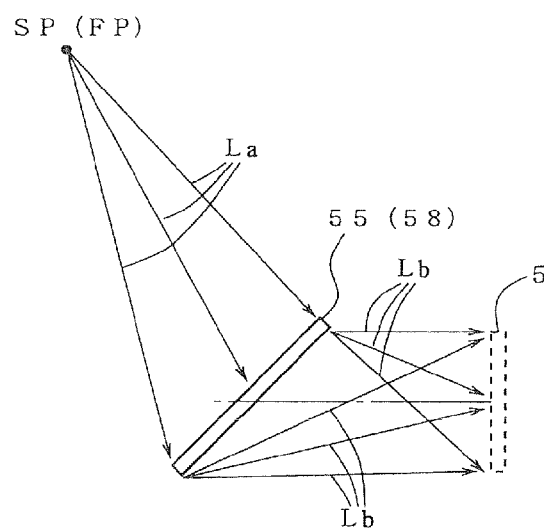
FIG. 4 is a view explaining a state in which an image of a scattering plate is reproduced using interference fringes generated in the hologram recording medium 55 obtained through an exposure process of FIG. 3.

FIG. 4 is a view explaining a state in which an image of a scattering plate is reproduced using interference fringes formed in the hologram recording medium 55 obtained through an exposure process of FIG. 3. As shown in FIG. 4, the hologram recording medium 55 produced with the hologram photosensitive material 58 of FIG. 3 meets its Bragg condition by means of light beams that have the same wavelength as the laser beams used in the exposure process and travel in a reverse direction of the reference beams Lr along an optical path of the reference beams Lr. Namely, as shown in FIG. 4, a diverging light flux that diverges from a reference point SP located with respect to the hologram recording medium 55 so as to have the same positional relationship as the relative position of the focal point FP in FIG. 3 with respect to the hologram photosensitive material 58 and that has the same wavelength as the reference beams Lr in the exposure process is diffracted by the hologram recording medium 55 as the reproduction illumination light beams La, thereby creating the image 5 of the scattering plate 6 at a specific location with respect to the hologram recording medium 50 so as to have the same positional relationship as the relative position of the scattering plate 6 in FIG. 3 with respect to the hologram photosensitive material 58 in the exposure process.

In this occasion, reproduction beams Lb. i.e. beams obtained by diffracting the reproduction illumination light beams La by the hologram recording medium 55, for creating a reproduced image 5 of the scattering plate 6 reproduce respective points of the image 5 of the scattering plate 6 as beams travelling in the reverse direction of the optical path of the object beams Lo travelled towards the hologram photosensitive material 58 from the scattering plate 6 in the exposure process. Moreover, as described above and as shown in FIG. 3, scattered beams Lo emitted from respective points of the light-emitting surface 6a of the scattering plate 6 in the exposure process are diffused, i.e. spread, to be incident on roughly entire region of the hologram photosensitive material 58. Namely, the object beams Lo from the entire region of the light-emitting surface 6a of the scattering plate 6 are incident on the respective points of the hologram photosensitive material 58. As a result, information of the entire light-emitting surface 6a is recorded at respective points of the hologram recording medium 55. Beams which constitute a diverging light flux from the reference point SP and function as the reproduction illumination light beams La are incident on respective points of the hologram recording medium 55 to reproduce the images 5 of the scattering plate 5 having the same contour as one another at the same location, i.e. the illumination zone LZ, respectively.

The light beams incident on the hologram recording medium 55 are diffracted in the direction of the illumination zone LZ, hence useless scattered light can be effectively restricted. Therefore, all of the reproduction illumination beams La incident on the hologram recording medium 55 can be effectively used for creating the image of the scattering plate 6.

Next, the configuration of the irradiation unit 60 that irradiates the optical device 50 made of the hologram recording medium 55 described above with coherent light beams will be explained. In the example shown in FIGS. 1 and 2, the irradiation unit 60 is provided with three laser sources 61 generating coherent light beams of the same wavelength range and a scanning device 65 that changes the propagation direction of coherent light beams from these laser sources 61.

The laser sources 61r, 61g and 61b emit coherent light beams of the same wavelength range, for example, emit light in green. The purpose of the present invention is to improve illumination intensity on the illumination zone LZ using a plurality of laser sources 61 that emit light in single color. There is no limitation to the color of light the laser sources 61 emit.

The hologram recording medium 55 is provided with a recording area 550 that is to be scanned by coherent light beams from the three laser sources 61. Interference fringes are formed on the recording area 550. Coherent light beams incident on the recording area 550 are diffracted by the interference fringes. With the diffraction, an image 5 of the scattering plate 6 is created by a reproduction beam of the color emitted by the three laser sources 61 on the entire region of the illumination zone LZ. The scanning device 65 changes a reflection angle of each coherent light beam from the laser sources 61 with time. In response to the change in reflection angle, each coherent light beam scans the recording area 550. The reflection angle of the scanning device 65 is preliminarily set so that each scanning range of the three coherent light beams deflects from the recording area 550.

The illumination zone LZ is illuminated with a single color by coherent light beams diffracted by the recording area 550. The three single-color laser sources 61 emit light simultaneously, hence its illumination intensity is three times as intense as the illumination intensity on the illumination zone LZ illuminated by a single laser source 61. Therefore, the illumination zone LZ can be illuminated brighter.

Each of the coherent light beams from the three laser sources 61 scans the recording area 550 to partially reproduce each unit area in the recording area 550 with time. Therefore, coherent light beams diffracted by hologram recording medium 55 illuminate the illumination zone LZ in different directions at different timings. Thus, there is no likelihood that illumination beams from different unit areas in the recording area 550 interfere with one another. As a result, speckle patterns corresponding to the number of unit areas in the recording area 550 are displayed in the manner of time division, which are averaged when viewed by an observer, thus speckles become invisible.

The scanning ranges of three coherent light beams from the three laser sources 61 may be adjacent to one another. Or the scanning ranges may have a gap therebetween. In this case, no coherent light beam reflected by the scanning device 65 is incident on the gap. This does not cause any practical problem. Moreover, the scanning ranges may not necessarily have an equal area. Furthermore, the scanning ranges may be overlapped one another.

As a manner of providing the recording area 550 in the hologram recording medium 55, a reference beam Lr and an object beam Lo are irradiated on the recording area 550 to generate interference fringes thereon, according to the principle of FIG. 3. In the present invention, only one recording area 550 is provided in the hologram recording medium 55. Therefore, the hologram recording medium 55 can be produced relatively easily.

The scanning device 65 changes the propagation direction of a coherent light beam with time to direct the coherent light beam in different directions so that the coherent light beam does not travel in the same direction. As a result, the propagation direction of the coherent light beam is changed by the scanning device 65 so as to scan the incidence surface of the hologram recording medium 55 in the optical device 50. In the example of FIG. 1, three types of coherent light beams are incident on the scanning device 65 from the laser sources 61. Therefore, the scanning device 65 changes the reflection angle of these coherent light beams with time to scan the incidence surface of the recording area 550 of the hologram recording medium 55.

Figure 5:
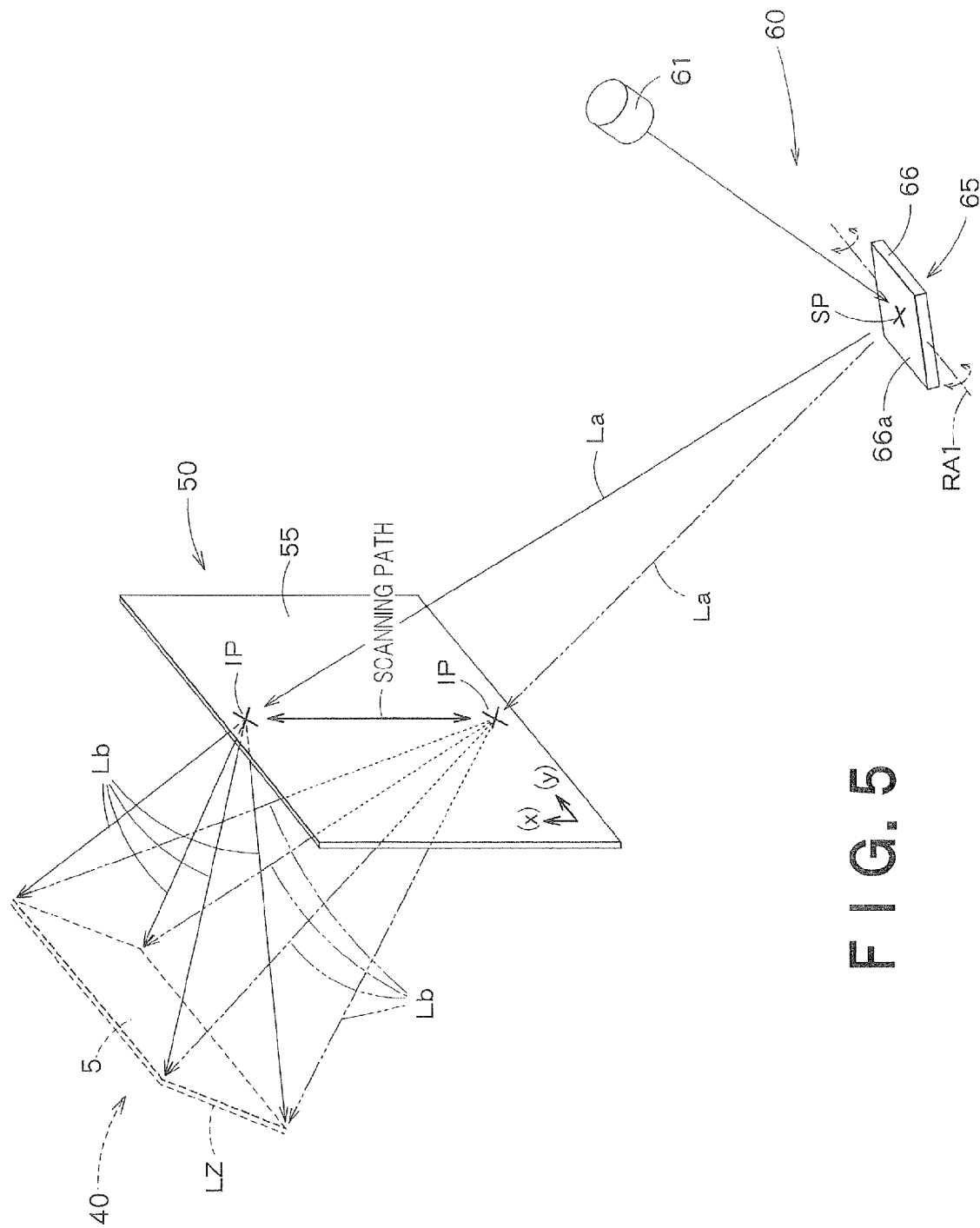
FIG. 5 is a view explaining a scanning route of a scanning device 65.

In the example of FIG. 2, the scanning device 65 includes a reflection device 66 having a reflection surface 66a rotatable about one axis line RA1. FIG. 5 is a view explaining a scanning route of the scanning device 65. As understood from FIG. 5, the reflection device 66 has a mirror device that has a mirror as the reflection surface 66a rotatable about one axis line RA1. The reflection device 66 is configured to change the orientation of the reflection surface 66a to change the propagation direction of the coherent light beams from the laser sources 61r, 61g and 61b . In this occasion, as shown in FIG. 5, the reflection device 66 is provided so as to receive the coherent light beams from the laser sources 61 roughly at the reference point SP.

A coherent light beam that has conducted final adjustments of the propagation direction by the reflection device 66, can be incident on the hologram recording medium 55 of the optical device 50 as a reproduction illumination light beam La capable of becoming one beam of a diverging light flux from the reference point SP in FIG. 4. As a result, coherent light beams from the irradiation unit 60 scan the hologram recording medium 55 and coherent light beams incident on respective positions of the hologram recording medium 55 reproduce images 5 of the scattering plate 6 having the same contour on the same location, i.e. the illumination zone LZ.

As shown in FIG. 5, the reflection device 66 shown in FIG. 5 is configured to rotate the reflection surface 66a about one axis line RA1. In the example shown in FIG. 5, the rotation axis line RA1 of the reflection surface 66a extends in parallel with the y-axis of the x-y axis system defined on the surface of the hologram recording medium 55, that is, the x-y axis system having the x-y plane in parallel with the surface of the hologram recording medium 55. Then, the reflection surface 66a rotates about the axis line RA1 in parallel with the y-axis of the x-y axis system defined on the surface of the hologram recording medium 55. Therefore, an incidence point IP of a coherent light beam from the irradiation unit 60 on the optical device 50 moves in a reciprocating motion in the direction parallel with the x-axis of the x-y axis system defined on the surface of the hologram recording medium 55. Namely, in the example shown in FIG. 5, the irradiation unit 60 irradiates the optical device 50 with a coherent light beam to scan the hologram recording medium 55 along a straight route.

The scanning device 65 having the reflection device 66 and other components is, as described above, a member rotatable about at least the axis line A1 such as a MEMS. The scanning device 65 periodically moves in rotational motion, however, there is no particular limitation on its rotational frequency.

As a practical problem, there is a case where the hologram photosensitive material 58 shrinks when the hologram recording medium 55 is produced. In such a case, it is preferable to adjust the recording angles of coherent light beams to be irradiated on the optical device 50 from the irradiation unit 60 under consideration of the shrinkage of the hologram photosensitive material 58. The wavelengths of coherent light beams generated by the laser sources 61 do not need to be precisely the same as the wavelength of the light beam used in the exposure process, recording process, of FIG. 3 but may be roughly the same.

In a similar reason, even if the propagation direction of a light beam to be incident on the hologram recording medium 55 of the optical device 50 does not take precisely the same route as that of one beam included in a diverging light flux from the reference point SP, an image 5 can be reproduced in the illumination zone LZ. Actually, in the examples shown in FIGS. 2 and 5, the mirror, i.e. reflection surface 66a of the reflection device 66 composing of the scanning device 65 is inevitably displaced from its rotational axis line RA1. Therefore, in the case where the reflection surface 66a is rotated about the rotational axis line RA1 that does not pass through the reference point SP, a light beam to be incident on the hologram recording medium 55 may not be one of the beams corresponding to a diverging light flux from the reference point SP. However, practically, an image 5 can be substantially reproduced in a manner that the image 5 is superimposed on the illumination zone LZ by means of coherent lights from the irradiation unit 60 having the shown configuration.

[Effects of Basic Embodiment]

Next, the functions of the illumination device 40, the projection apparatus 20 and the projection-type image display apparatus 10 having the configurations described above will be explained.

Firstly, the irradiation unit 60 irradiates the optical device 50 with coherent light beams so as to scan the hologram recording medium 55 of the optical device 50. Specifically, the laser sources 61 generate coherent light beams having a specific wavelength that travel along a unidirection. These coherent light beams are emitted to the same reference point on the scanning device 65 to change their respective propagation directions. More specifically, the coherent light beams travel towards the hologram recording medium 55 at reflection angles in accordance with incident angles from the laser sources 61, respectively.

The scanning device 65 makes coherent light beams incident on specific positions in the recording area 550 on the hologram recording medium 55 at an incident angle that meets the Bragg condition on the respective positions. As a result, the coherent light beams incident on the specific positions in the recording area 550 is diffracted by interference fringes recorded in the hologram recording medium 55 and reproduce images 5 of the scattering plate 6 to be overlapped on the entire region of the illumination zone LZ. Namely, the coherent light beams incident on specific positions in respective recording areas are diffused, i.e. spread, by the optical device 50 to be incident on the entire region of the illumination zone LZ. In this way, the irradiation unit 60 illuminates the illumination zone LZ with coherent light beams. As described above, the laser sources 61 emit light in the same color, and hence images 5 of the scattering plate 6 are reproduced on the illumination zone LZ in the same color. Therefore, when the laser sources 61 emit light simultaneously, the illumination zone LZ is illuminated at the illumination intensity three times as intense as when it is illuminated by a single laser source 61.

The position of incidence of coherent light beams from the scanning device 65 is shifted with time in the recording area 550 by the drive of the scanning device 65. In FIG. 1, coherent light beams from the three laser sources 61 are reflected by the scanning device 65 and the reflected coherent light beams are incident on three positions of the recording area 550, respectively, as diverging light. Therefore, when the scanning device 65 rotates, the coherent light beams scan the recording area 550 with the respective three positions as a reference. Accordingly, the rotary amount of the scanning device 65 is less, compared with the case of scanning the entire recording area 550 with a single coherent light beam.

The feature of the present embodiment is not to merely increase the number of the laser sources 61. The feature of the present embodiment is to provide a plurality of laser sources 61, to use every coherent light beams from each of the laser sources 61 for uniform illumination of the entire illumination zone LZ, and to rotate the scanning device 65, thereby making speckles invisible in the illumination zone LZ. This kind of feature cannot be achieved with a mere arrangement of a plurality of laser sources 61. According to the present embodiment, the feature explained above can be achieved by providing the illumination device 40 shown in FIG. 1. When the above feature is trying to be achieved with another configuration, it is expected to be very complex. In this regard, if the configuration of FIG. 1 is adopted, it is possible to drastically decrease the number of parts. Moreover, according to the present embodiment, it is possible to flexibly increase or decrease the laser sources 61, thereby easily setting the illumination intensity on the illumination zone LZ to a desired level.

As shown in FIG. 1, in the projection apparatus 20, the spatial light modulator 30 is provided at the location overlapping with the illumination zone LZ. Therefore, the spatial light modulator 30 is illuminated by the illumination device 40 in the plane direction so that coherent light beams are selectively passed through per pixel to create an image. This image is projected onto the screen 15 by the projection optical system 25. The coherent light beams projected onto the screen 15 are diffused and recognized by an observer as an image. Nevertheless, the coherent light beams projected onto the screen 15 interfere with one another due to the diffusion, thereby generating speckles.

However, according to the illumination device 40 in the basic embodiment described here, speckles become inconspicuous very effectively, as explained below.

According to Speckle Phenomena in Optics, Joseph W. Goodman, Roberts & Co., 2006 cited above, it is effective to integrate parameters such as polarization, phase, angle and time to increase modes. The modes here are speckle patterns with no correlation one anther. For example, in the case where coherent light beams are projected onto the same screen in different directions from a plurality of laser sources, modes exist in the same number as the laser sources. Moreover, in the case where coherent light beams are projected onto a screen in different directions intermittently from the same laser source, modes exist by the number of changes in the incidence direction of the coherent light beams during the time that is not covered by the resolution of human eyes. It is assumed that, in the case where there are many modes, the interference patterns of light are superimposed and averaged with no correlation, and as a result, speckles observed by eyes of an observer become inconspicuous.

In the irradiation unit 60 described above, coherent light beams are emitted to the optical device 50 to scan the hologram recording medium 55. Although coherent light beams incident on respective locations of the hologram recording medium 55 illuminate the entire region of the same illumination zone LZ, the illuminating direction of the coherent light beams to illuminate the illumination zone LZ are different from one another. And, since the position on the hologram recording medium 55 on which a coherent light beam is incident changes with time, the incidence direction of the coherent light beam on the illumination zone LZ also changes with time.

When considering the illumination zone LZ as the reference, a coherent light beam is always incident on each location of the illumination zone LZ, however, its incidence direction always changes within a range of angle indicated by A1 in FIG. 2. As a result, a light beam that makes up each pixel of an image created by light passing through the spatial light modulator 30 is projected onto a specific position of the screen 15 while changing its optical path with time within a range of angle indicated by A2 in FIG. 2.

A coherent light beam continuously scans the hologram recording medium 55. Following to this, the incidence direction of a coherent light beam to the illumination zone LZ from the irradiation unit 60 also continuously changes and the incidence direction of a coherent light beam to the screen 15 from the projection apparatus 20 also continuously changes. When the incidence direction of a coherent light beam to the screen 15 from the projection apparatus 20 changes slightly, for example, an angle less than 1°, a speckle pattern generated on the screen 15 changes greatly, resulting in superimposition of speckle patterns with no correlation. In addition, the frequency of a scanning device 65 such as a MEMS mirror and a polygonal mirror actually on the market is usually several hundred Hz or higher and a scanning device 65 of frequency reaching several ten thousands Hz is not rare.

Accordingly, according to the basic embodiment described above, the incidence direction of a coherent light beam changes with time on each location on the screen 15 that is displaying an image and this change occurs at a speed not covered by the resolution of human eyes. As a result, scattering patterns of coherent light beams with no correlation are superimposed and observed by human eyes. Therefore, speckles generated corresponding to respective scattering patterns are superimposed and observed by an observer. Accordingly, speckles become inconspicuous effectively to an observer who observes an image displayed on the screen 15 that is displaying an image.

Conventionally, speckles observed by humans include not only speckles at the screen side caused by the scattering of coherent light beams on the screen 15 but also speckles at the projection apparatus side that could occur due to the scattering of coherent light beams before projection onto the screen. The speckle pattern generated at the projection apparatus side is also recognizable to an observer by being projected onto the screen 15 via the spatial light modulator 30. However, according to the basic embodiment described above, coherent light beams continuously scan the hologram recording medium 55 and each of the coherent light beams incident on respective locations on the hologram recording medium 55 illuminates the entire region of the illumination zone LZ on which the spatial light modulator 30 is provided. Namely, the hologram recording medium 55 creates new wavefronts different from the prior wavefronts that have formed speckle patterns, thereby illuminating the screen 15 in a complex manner and uniformly via the illumination zone LZ and further the spatial light modulator 30. By the creation of new wavefronts at the hologram recording medium 55, speckle patterns generated at the projection apparatus side become invisible.

In Speckle Phenomena in Optics, Joseph W. Goodman, Roberts & Co., 2006 mentioned above, a method using a numerical value corresponding to a speckle contrast as a parameter to indicate the degree of speckles generated on a screen has been proposed. The speckle contrast is the quantity defined as a value obtained by dividing the standard deviation of variation in intensity actually occurred on a screen by an average value of the intensity when a test-pattern image to originally exhibit uniform intensity distribution is displayed. A larger value of the speckle contrast means a larger degree of generation of speckles on a screen and indicates to an observer that a spotted luminance-unevenness pattern is more remarkable.

According to the experiments by the inventor of the present invention, the measurements of the speckle contrast show that a speckle contrast was 3.0%, hereinafter called Condition 1, for an projection-type image display apparatus according to the basic embodiment configured with a single laser source and a reflection-type volume hologram. In addition, instead of the reflection volume hologram, when a relief hologram was used as the optical device 50 described, as a computer-generated hologram (CGH) having a convex-concave shape designed using a computer so as to reproduce the image 5 of the scattering plate 6 when receiving a specific reproduction illumination light beam, a speckle contrast was 3.7%, hereinafter called Condition 2. In an HDTV (high definition TV) display application, a speckle contrast of 6.0% or less is set as the standard as level at which an observer cannot almost recognize a luminance-unevenness pattern through visual observation, for example, refer to WO/2001/081996. The basic embodiment described above fully satisfies the standard. Moreover, in actual visual observation, luminance unevenness, i.e. brightness unevenness, did not occur to a degree that it can be visually perceived.

On the other hand, when beams from a laser source were shaped into a parallel light flux and incident on the spatial light modulator 30, that is, when coherent light beams from a single laser source were incident on the spatial light modulator 30 of the projection-type image display apparatus 10 shown in FIG. 1 as a parallel light flux without via the scanning device 65 and the optical device 50, a speckle contrast was 20.7%, hereinafter called Condition 3. Under this condition, spotted luminance-unevenness patterns were very conspicuously observed through visual observation.

In addition, when the laser source was replaced with a green LED being an incoherent light source and light beams from this LED light source were incident on the spatial light modulator 30, that is, when incoherent light beams from the LED light source were incident on the spatial light modulator 30 of the projection-type image display apparatus 10 shown in FIG. 1 as a parallel light flux without via the scan device 65 and the optical device 50, a speckle contrast was 4.0%, hereinafter called Condition 4. Under this condition, luminance unevenness, i.e. brightness unevenness, to a degree that it can be perceived through visual observation did not occur.

The results of Conditions 1 and 2 are much better than the result of Condition 3 and are also better than the measurement result of Condition 4. As discussed above, the problem of generation of speckles is practically a problem unique to the case of using a coherent light source of a laser beam or the like, and thus, the problem needs not be considered in the case of an apparatus using an incoherent light source such as an LED. In addition, in comparison with Condition 4, in Conditions 1 and 2, the optical device 50 which may cause generation of speckles is added. In view of these points, it can be said that the speckle defect was dealt with sufficiently according to Conditions 1 and 2.

In addition, according to the basic embodiment described above, the following advantages can be obtained.

According to the basic embodiment described above, the optical device 50 for making speckles inconspicuous can also function as an optical member for shaping and adjusting the beam shape of a coherent light beam irradiated from the irradiation device 60. Therefore, it is possible to miniaturize and simplify the optical system.

Moreover, according to the basic embodiment described above, coherent light beams incident on respective recording areas of the hologram recording medium 55 create images of the scattering plate 6 in respective colors on the entire region of the illumination zone LZ and the spatial light modulator 30 is provided at the location overlapped with the image 5. Therefore, it is possible to utilize all of the light beams diffracted by the hologram recording medium 55 for image creation, thus improving utilization efficiency of light beams from the laser sources 61.

[Mode of Coherent Light Beam Emitting Direction]

In FIG. 1, coherent light beams from the laser sources 61 are converged on one point of the scanning device 65. Therefore, the area of the mirror surface of the scanning device 65 can be smaller, the weight of the scanning device 65 can be lighter, and power consumption needed for rotation of the scanning device 65 can be smaller. Nevertheless, since coherent light beams from the laser sources 61 are converged on one point, intense light is emitted to a specific portion of the mirror surface. Therefore, there is a problem concerning durability in that the lifetime of the scanning device 65 becomes shorter. For this reason, a technique of scattering coherent light beams emitted to the mirror surface of the scanning device 65 can also be considered.

Figure 6:
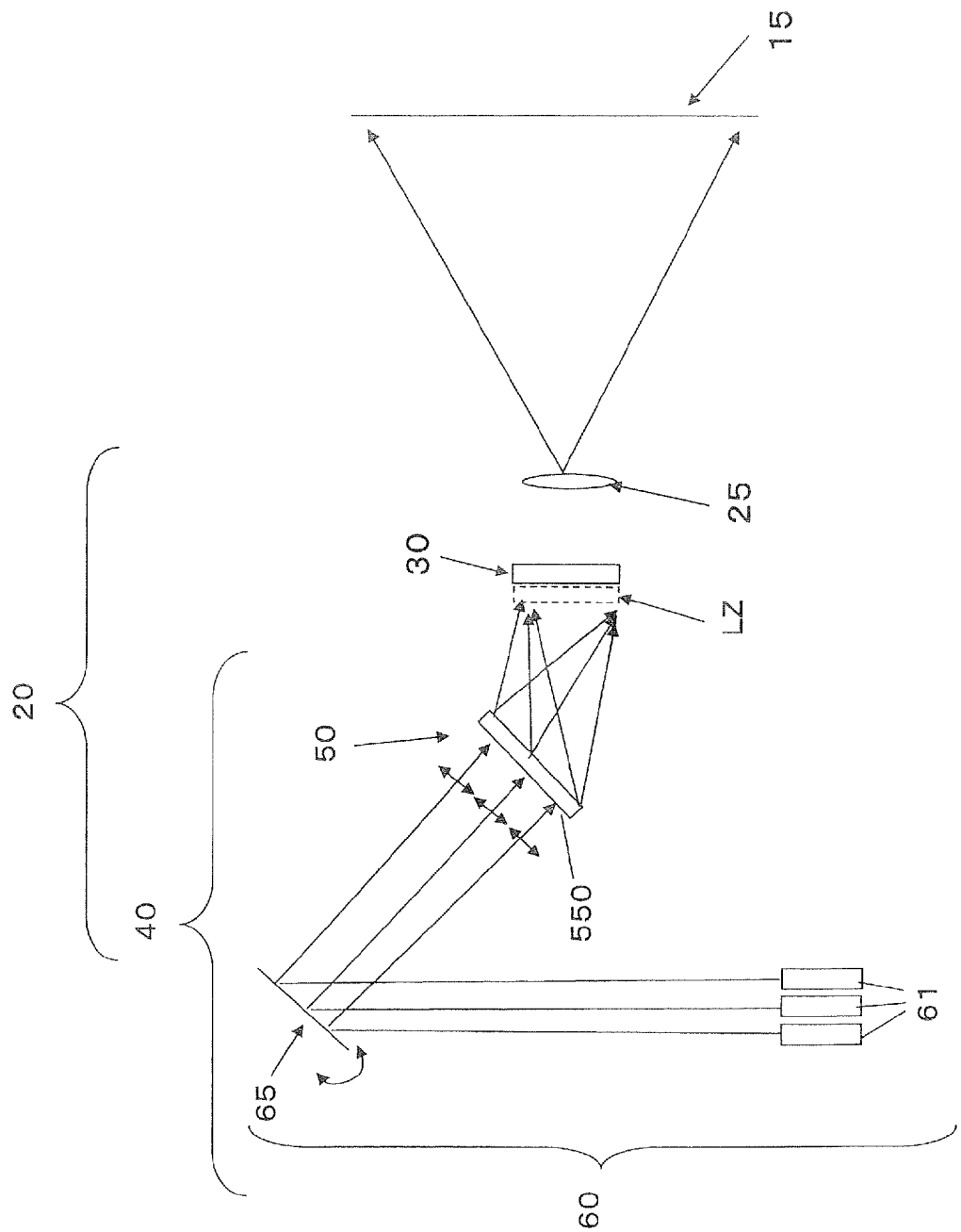
FIG. 6 is a view showing a modification of FIG. 1.

FIG. 6 is a view showing one example of a projection-type image display apparatus 10a in which coherent light beams emitted from three laser sources 61 are incident on a scanning device 65 as parallel beams and coherent light beams reflected by a scanning device 65 are incident on a hologram recording medium 55 as diverging beams.

In the projection-type image display apparatus 10a of FIG. 6, coherent light beams emitted from the laser sources 61 are incident on three positions of the scanning device 65 and the coherent light beams are reflected from the respective positions towards the hologram recording medium 55.

As described above, since the scanning device 65 performs a rotary motion, the reflection angle of each reflected coherent light beam also changes in accordance with the rotary motion. However, the parallel state of the three types of reflected coherent light beams remain unchanged. Therefore, the corresponding coherent light beams are incident on the three positions of the recording area 550 in the hologram recording medium 55.

Accordingly, in the projection-type image display apparatus 10a of FIG. 6, reflected beams of a light flux incident on the scanning device 65 in parallel are guided to the hologram recording medium 55. Therefore, it is required to partition the hologram recording medium 55 into three regions and provide three reference beams Lr of a converged light flux to be emitted to the respective three regions, instead of the converged light flux shown in FIG. 3, as reference beams Lr to be used for forming interference fringes on the hologram recording medium 55 beforehand.

Moreover, as described above, coherent light beams emitted to the mirror surface of the scanning device 65 are scattered so that intense light is not emitted to specific positions of the mirror surface, thus the durability of the scanning device 65 is improved.

Furthermore, it is easier to arrange the laser sources 61 so that coherent light beams therefrom become parallel beams, instead of converging coherent light beams from the respective laser sources on one point as shown in FIG. 1. Therefore, the apparatus of FIG. 6 is superior to the apparatus of FIG. 1 in terms of adjustments, and the like.

Figure 7:
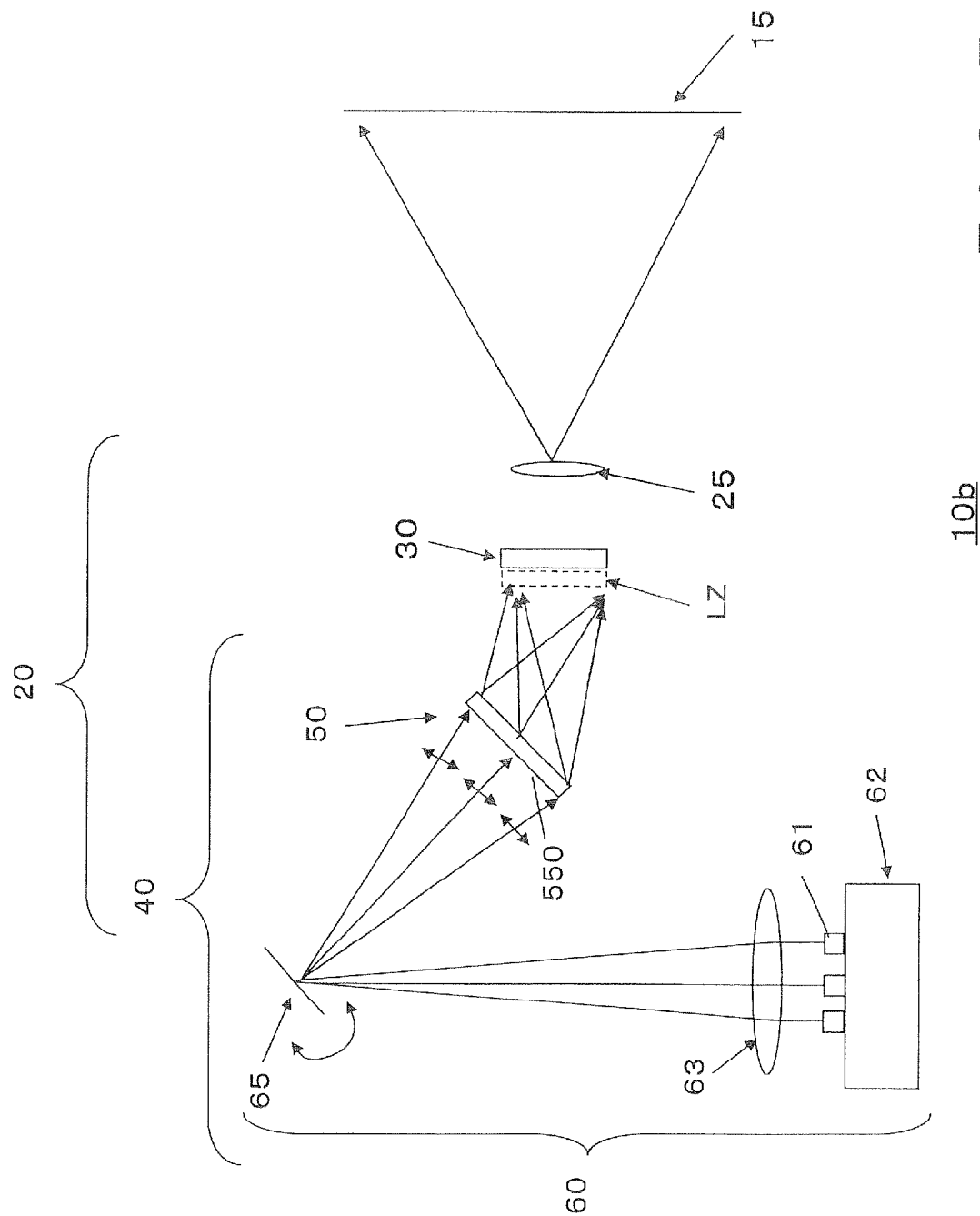
FIG. 7 is a view showing another modification of FIG. 1.

However, it is required for the apparatus of FIG. 7 to have a larger mirror surface than in the case of FIG. 1 where three types of coherent light beams are converged on one point of the mirror surface. Therefore, due to the increase in size of the scanning device 65, power consumption could also be increased in the apparatus of FIG. 7.

On the contrary, FIG. 7 is a view showing one example of a projection-type image display apparatus 10b using a laser array 62 having three laser sources 61 arranged adjacent to one another incorporated into one chip, as a light source. Since the laser sources 61r, 61g and 61b in the laser array 62 emit coherent light beams in a parallel direction, a convergence lens 63 is provided as a convergent optical system to converge these coherent light beams on the same point of the scanning device 65. Therefore, the apparatus of FIG. 7 uses the same type of hologram recording medium 55 as the apparatus of FIG. 1 and the configuration of the projection optical system of the apparatus of FIG. 7 is the same as the apparatus of FIG. 1.

In the apparatus of FIG. 7, by using the laser array 62, the positioning of the laser sources 61 becomes easy, so that the variation in optical path between the devices is restricted.

Figure 8:
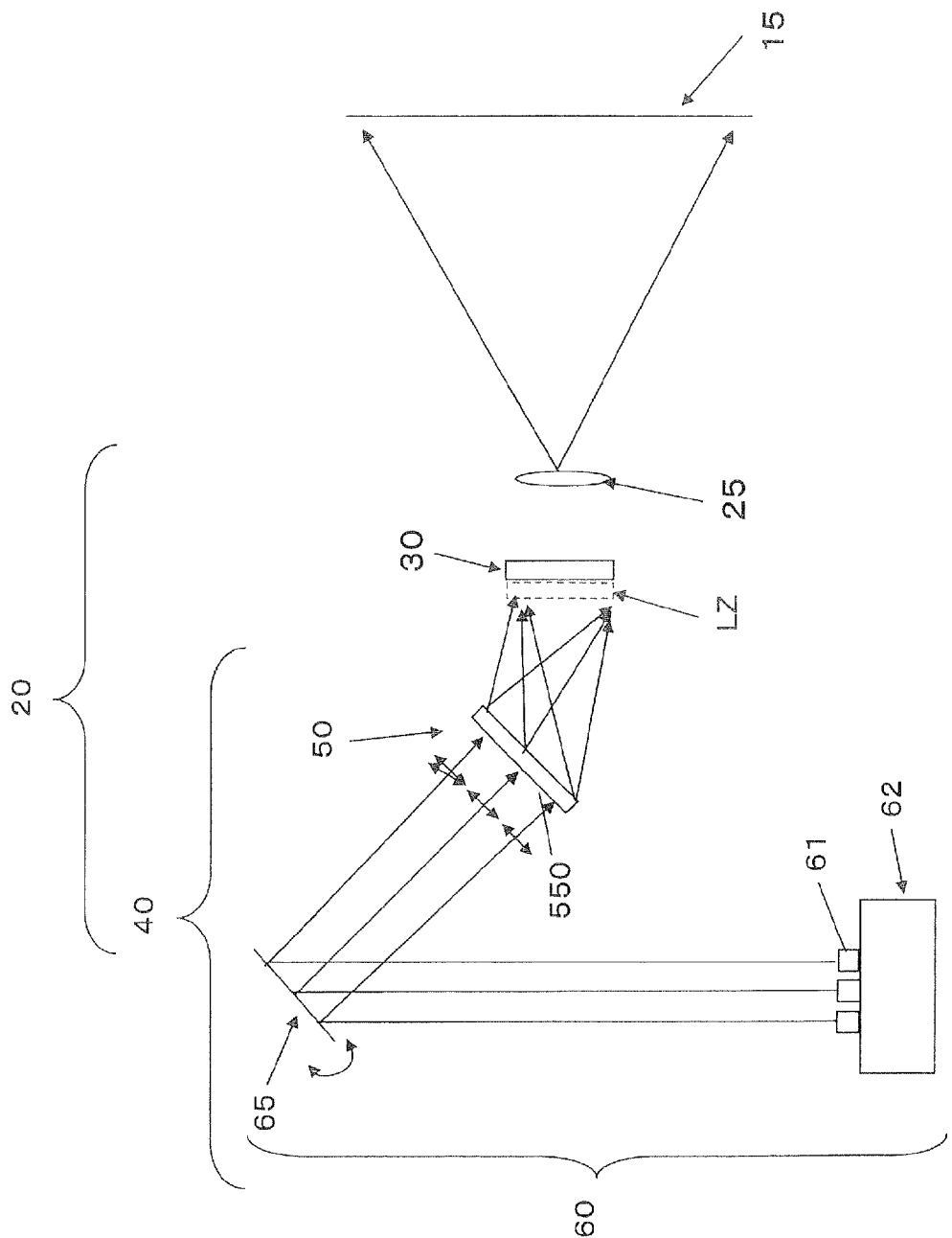
FIG. 8 is a view showing another modification of FIG. 1.

FIG. 8 is a view showing one example of a projection-type image display apparatus 10c in which parallel coherent light beams from a laser array 62 are directly incident on a scanning device 65 and beams reflected from the scanning device 65 are incident on a hologram recording medium 55. The optical path of coherent light beams in FIG. 8 is the same as in FIG. 6, so that there are the same advantages and disadvantages as in FIG. 6. The positioning of the laser sources 61 is easier in FIG. 8 than in FIG. 6 just as much as the use of the laser array 62.

Figure 9:
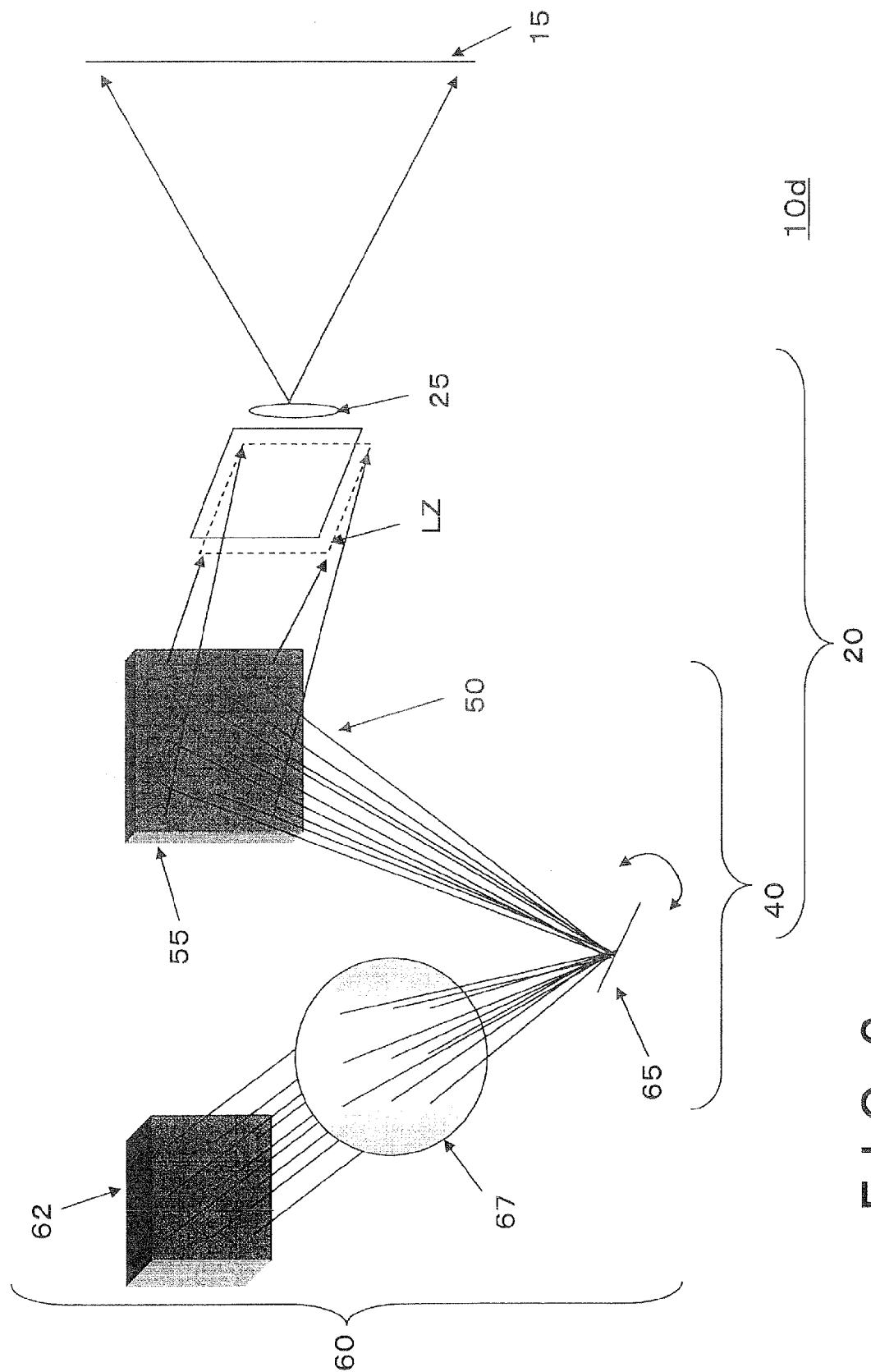
FIG. 9 is a view showing another modification of FIG. 1.

FIG. 9 is a view showing one example of a projection-type image display apparatus 10d configured using a two-dimensional laser array 62 having laser arrays arranged in a longitudinal direction with single-color laser sources arranged in a lateral direction. Coherent light beams emitted from these laser sources 61 pass through a convergence lens 67 as a convergent optical system and are converged on the same point of a scanning device 65. The scanning device 65 reflects these coherent light beams at an angle in accordance with the incident angle of the coherent light beams, so that the coherent light beams are incident on nine positions in a recording area 550 provided on a hologram recording medium 55. The scanning device 65 makes the coherent light beams from the nine laser sources scan respective specific areas in the recording area 550.

In the apparatus of FIG. 9, compared with the apparatuses of FIG. 1 and other figures, the number of laser sources to be used is three times larger. Therefore, it is possible to illuminate the illumination zone LZ brighter depending on the number of laser sources, thus easily achieving higher illumination intensity.

[Avoidance of Zero-Order Light]

Part of coherent light beams from the irradiation unit 60 is not diffracted by the hologram recording medium 55 but passes though it. This type of light is called zero-order light. When zero-order light is incident on the illumination zone LZ, an abnormal region such as a spotted region, a line region, and a plane region, inevitably appears in which brightness and intensity are rapidly increased compared with the surroundings.

When the reflection-type hologram recording medium 55 is used, the spatial light modulator 30 and the projection optical system 25 are not arranged in a propagation direction of zero-order light, hence it is relatively easy to avoid zero-order light. However, when the transmission-type hologram recording medium 55 such as shown in FIGS. 1 and 2 is used, the spatial light modulator 30 and the projection optical system 25 are highly likely arranged in a propagation direction of zero-order light, hence care must be taken.

For example, when compared with FIG. 1, in the configuration of FIG. 2, even if zero-order light passes through the hologram recording medium 55, the spatial light modulator 30 and the projection optical system 25 are not provided in its direction. Therefore, the zero-order light is highly likely avoided. However, in the configuration of FIG. 1, since the optical path of coherent light beams reflected by the scanning device 65 changes, zero-order light may pass through the spatial light modulator 30 and the projection optical system 25. For this reason, even in the case where the configuration of FIG. 1 is employed, it is required to design the locations of the scanning device 65, the spatial light modulator 30 and the projection optical system 25 so as to be arranged in accordance with the propagation path of zero-order light so that the zero-order light does not pass through the spatial light modulator 30 and the projection optical system 25.

[Structure of Hologram Recording Medium]

Interference fringes are formed on the recording area 550 of the hologram recording medium 55 explained with reference to FIG. 1 and other drawings. The interference fringes are formed so that, at a designed incident angle of a coherent light beam, the diffraction condition of a coherent light beam of another color, i.e. wavelength range, does not influence the diffraction condition of the coherent light beam, namely, wavenumber spectra of the coherent light beams when diffracted do not interfere with each other. In order to achieve the prevention of interference, it is required to adjust the film thickness and the amount of refractive index modulation Δn of the hologram recording medium 55.

[Reflection- and Transmission-Type Hologram Recording Media]

The hologram recording medium 55 may be of reflection type of transmission type. Reflection-type hologram recording media, hereinafter, "reflection-type holograms", has higher wavelength selectivity than transmission-type hologram recording media, hereinafter, "transmission-type holograms". In other words, in reflection-type holograms, although interference fringes corresponding to different wavelengths are superimposed one another in layers, a coherent light beam having a desired wavelength can be diffracted by a desired layer only. In addition, reflection-type holograms are excellent in that the influence of zero-order light can be easily removed.

On the other hand, although transmission-type holograms have a wide spectrum range for diffraction and a high acceptable level to laser sources, if interference fringes corresponding to different wavelengths are superimposed one another in layers, layers other than a desired layer also diffract coherent light of a desired wavelength. Therefore, in general, it is difficult to configure transmission-type holograms in a layered structure.

[Modification of Basic Embodiment]

The basic embodiment described above based on one specific example exemplified in FIGS. 1 to 5 can be modified in various forms. Hereinafter, an example of modification will be described with reference to the drawings. In the drawings used for the description hereinafter, the components corresponding to those of the embodiments described above are denoted by the same reference numerals, and the description thereof is omitted.

(Illumination Device)

According to the embodiments described above, it is possible to effectively making speckles inconspicuous. However, the effect is mainly caused by the illumination device 40. Therefore, the illumination device 40 can be used in a variety of modes. For example, the illumination device 40 can be used for illumination merely. In this case, it is possible to reduce brightness unevenness, i.e. luminance unevenness and flicker. For example, in the configuration of FIG. 1, it has the laser sources 61 that emit light beams in a single color, and hence an illumination device 40 of a single color can be realized by exciting these laser sources simultaneously.

Moreover, when the emission color of the three laser sources 61 is white, the illumination color is also white. Therefore, the white light may be used in illumination for a scanner such as an image reader. In such an example, by placing an object to be scanned on the illumination zone LZ for the illumination device 40, speckles generated on the object can be inconspicuous. As a result, it can be possible to eliminate an image correction means or the like conventionally needed.

When the illumination device 40 is incorporated in a scanner, the illumination zone LZ for the illumination device 40 may be a plane, like the embodiments described above. Or the illumination zone LZ for the illumination device 40 may be a long and narrow zone, i.e. a zone which can be called line-like, extending in one direction. In this case, a two-dimensional image can be read by moving the illumination device 40 incorporated in a scanner relative to an object in a direction that orthogonal to the one direction.

Moreover, as shown in FIG. 10, the optical device 50 may include a plurality of hologram recording media 55-1, 55-2, . . . that are arranged in a manner that they are aligned so as not to be overlapped with one another. The hologram recording media 55-1, 55-2, . . . shown in FIG. 10 are formed into a strip-like shape and are arranged in a manner that they are aligned with no gap between one another in a direction vertical to their longitudinal directions. The hologram recording media 55-1, 55-2, . . . are located on the same imaginary plane. The hologram recording media 55-1, 55-2, . . . form images 5 of the scattering plate 6 in respective illumination zones LZ-1, LZ-2, . . . that are arranged in a manner that they are aligned so as not to be overlapped with one another. In other words, the illumination zones LZ-1, LZ-2, . . . are illuminated with coherent light beams. The illumination zones LZ-1, LZ-2, . . . are formed into a long and narrow zone, i.e. a zone which can be called line-like, and are arranged in a manner that they are aligned with no gap between one another in a direction vertical to their longitudinal directions. The illumination zones LZ-1, LZ-2, . . . are located on the same imaginary plane.

In the example shown in FIG. 10, the illumination zones LZ-1, LZ-2, . . . may be illuminated, as follows. Firstly, the irradiation unit 60 emits a coherent light beam to the first hologram recording medium 55-1 so that the coherent light beam repeatedly scan the first hologram recording medium 55-1 along a path in the longitudinal direction, i.e. the one direction described above, of the first hologram recording medium 55-1. Coherent light beams incident on respective positions of the first hologram recording medium 55-1 reproduce images 5 of the line-like or long-and-narrow scattering plate 6 in a manner that the images 5 are superimposed on the first illumination zone LZ-1 to illuminate the first illumination zone LZ-1. When a predetermined time passes, the irradiation unit 60 emits a coherent light beam to the second hologram recording medium 55-2 adjacent to the first hologram recording medium 55-1 to illuminate the second illumination zone LZ-2 adjacent to the first illumination zone LZ-1 with the coherent light beam in place of the first illumination zone LZ-1. Following to this, each hologram recording medium is irradiated with a coherent light beam so that the illumination zone corresponding to the hologram recording medium is illuminated with the coherent light beam. According to the method described above, it is possible to read a two-dimensional image information without moving the illumination device.

(Spatial Light Modulator, Projection Optical System, and Screen)

According to the embodiments described above, it is possible to effectively make speckles inconspicuous. However, the effects are mainly caused by the illumination device 40. Then, even if the illumination device 40 is combined with various known spatial light modulators, projection optical systems, screens, and the like, it is possible to effectively make speckles inconspicuous. Due to this point, the spatial light modulator, the projection optical system, and the screen are not limited to the exemplified ones, but various known members, parts, apparatuses, and the like may be used.

(Projection-Type Image Display Apparatus)

In addition, although the example is illustrated in which the hologram recording medium 55 is produced by an interference exposure method using the planar scattering plate 6 having a shape corresponding to the incidence planes of the spatial light modulator 30, the present invention is not limited thereto. The hologram recording medium 55 may be produced by an interference exposure method using a scattering plate having some pattern. In this case, an image of the scattering plate having some pattern is reproduced by the hologram recording medium 55. In other words, the optical device 50, i.e. hologram recording medium 55, illuminates the illumination region LZ having some pattern. In the case where this optical device 50 is used, by eliminating the spatial light modulator 30 and the projection optical system 25 from the basic embodiment described above and disposing the screen 15 at the position that overlaps with the illumination region LZ, it is possible to display some pattern recorded in the hologram recording medium 55 on the screen 15. Also in this display apparatus, by emitting a coherent light beam from the irradiation device 60 to the optical device 50 so that the coherent light beam scans the hologram recording medium 55, it is possible to make the speckles be inconspicuous on the screen 15.

FIG. 11 shows one example of such example. In the illustrated example, the optical device 50 includes first to third hologram recording media 55-1, 55-2 and 55-3. The first to third hologram recording media 55-1, 55-2 and 55-3 are arranged on a plane parallel to the incidence plane of the optical device 50 in a manner that they are displaced from one another so as not to be overlapped with one another. Each of the hologram recording media 55-1, 55-2 and 55-3 can reproduce an image 5 having the contour of an arrow. In other words, illumination zones LZ-1, LZ-2 and LZ-3 having the contour of an arrow can be illuminated with coherent light beams. The first to third illumination zones LZ-1, LZ-2 and LZ-3 corresponding to the hologram recording media 55-1, 55-2 and 55-3, respectively, are arranged on the same imaginary plane in a manner that they are not overlapped with one another. Above all, in the illustrated example, the directions indicated by the arrows corresponding to the illumination zones LZ-1, LZ-2 and LZ-3 are oriented in the same direction and the first to third illumination zones LZ-1, LZ-2 and LZ-3 are located in this order in this direction. For example, when a coherent light beam from the irradiation unit 60 is scanning the first hologram recording medium 55-1, the first illumination zone LZ-1 located most behind is illuminated. As an example, next, as shown in FIG. 11, a coherent light beam from the irradiation unit 60 scans the second hologram recording medium 55-2 so that the second illumination zone LZ-2 located in the center is illuminated. Thereafter, when a coherent light beam from the irradiation unit 60 scans the third hologram recording medium 55-1, the third illumination zone LZ-1 located most ahead is illuminated.

(Irradiation Device)

Figure 12:
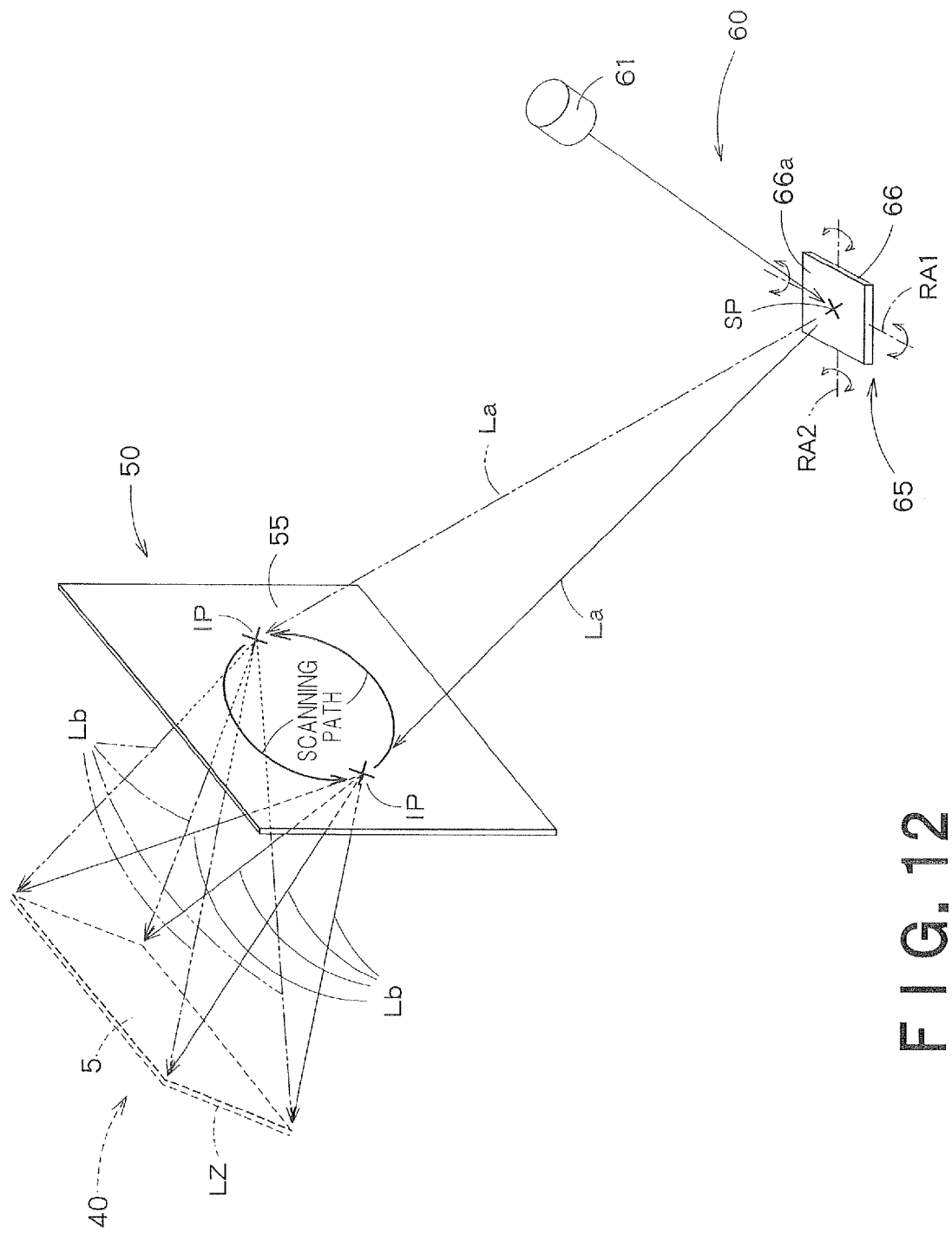
FIG. 12 is a view showing an example in which a mirror device 66 is rotated in two axial directions.

The embodiments described above shows an example in which the irradiation unit 60 includes the laser sources 61 and the scanning device 65. The scanning device 65 includes, for example, the one-axis-rotation type reflection device 66 that changes the propagation direction of a coherent light beam by reflection. However, the scanning device 65 is not limited thereto. As shown in FIG. 12, the scanning device 65 may be configured so that the mirror, i.e. reflection surface 66a, of the reflection device 66 can rotate about the first rotation axis line RA1 as well as about a second rotation axis line RA2 intersecting the first rotation axis line RA1. In the example shown in FIG. 12, the second rotation axis line RA2 of the reflection device 66 is perpendicular to the first rotation axis line RA1 which is extended in parallel to the Y axis of the XY coordinate system defined on the plate plane of the hologram recording medium 55. Then, since the reflection device 66 can rotate about both of the first axis line RA1 and the second axis line RA2, the incidence point IP of a coherent light beam of the irradiation unit 60 incident on the optical device 50 can be shifted on the plate plane of the hologram recording medium 55 in two-dimensional directions. Therefore, as an example, as shown in FIG. 12, the incidence point IP of a coherent light beam incident on the optical device 50 can be shifted along a circumference.

Moreover, the scanning device 65 may include two or more reflection devices 66. In this case, although the reflection surface 66a of the reflection device 66 can rotate about only a single axis line, the incidence point IP of a coherent light beam from the irradiation device 60 incident on the optical device 50 can be shifted on the plate plane of the hologram recording medium 55 in two-dimensional directions.

As a concrete example of the reflection device 66 included in the scanning device 65, there are a MEMS mirror, a polygonal mirror, and the like.

Moreover, the scanning device 65 may be configured to include other devices other than a reflection device, for example, the reflection device 66 described above, which changes the propagation direction of a coherent light beam by reflection. For example, the scan device 65 may include a refraction prism, a lens, etc.

Essentially, the scanning device 65 is not a necessary component. The light sources 61 of the irradiation device 60 may be configured so that they can be displaced, i.e. moved, oscillated, and rotated, with respect to the optical device 50. Coherent light beams emitted therefrom may scan the hologram recording medium 55 in accordance with the displacement of the light sources 61 with respect to the optical device.

Moreover, although the description hereinbefore is made on condition that the light sources 61 of the irradiation device 60 oscillate a laser beam shaped into a line beam, the preset invention is not limited thereto. Particularly, in the embodiments described above, coherent light beams emitted to respective positions of the optical device 50 are shaped by the optical device 50 into a light flux which is incident on the entire region of the illumination region LZ. Therefore, no problem occurs even if coherent light beams emitted from the light sources 61 of the irradiation device 60 to the optical device 50 are not accurately shaped. For this reason, coherent light beams generated from the light sources 61 may be diverging light. In addition, the shape of coherent light beams, in cross section, generated from the light sources 61 may be an ellipse or the like instead of a circle. In addition, the transverse mode of coherent light beams generated from the light sources 61 may be a multi-mode.

In addition, when the light sources 61 generate a diverging light flux, coherent light beams are incident on the hologram recording medium 55 of the optical device 50 not on a spot but on a region having a certain area. In this case, light beams which are diffracted by the hologram recording medium and incident on respective positions of the illumination region LZ are angle-multiplexed. In other words, in each instant, on respective positions of the illumination region LZ, coherent light beams are incident from directions within a certain angle range. Due to the angle-multiplexing, it is possible to more effectively make speckles inconspicuous.

Figure 13:
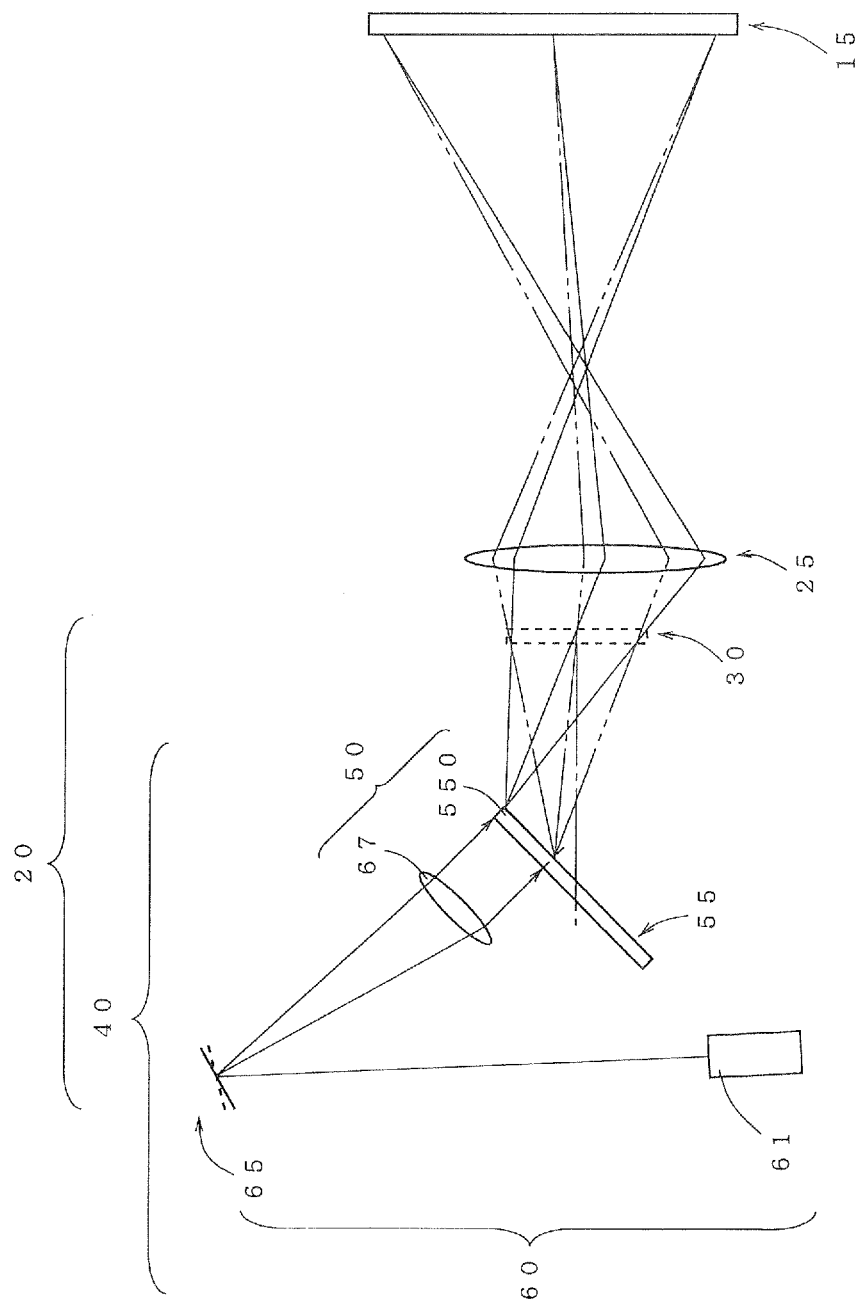
FIG. 13 is a view showing an example in which a parallel beam is incident on the hologram recording medium 55.

Moreover, in the embodiments described above, although the example is described in which the irradiation unit 60 emits a coherent light beam to the optical device 50 so that the coherent light beam traces the optical path of one beam included in a light flux, the present invention is not limited thereto. For example, in the above embodiments, as shown in FIG. 13, the scanning device 65 may further include a condenser lens 67 disposed at the downstream side of the reflection device 66 along the optical path of a coherent light beam. In this case, a light beam from the reflection device 66, which propagates along the optical path of light beams constituting a light flux, becomes a light beam that propagates in a certain direction through the condenser lens 67. In other words, the irradiation device 60 emits a coherent light beam to the optical device 50 so that the coherent light beam traces the optical path of one beam included in a light flux. In this kind of example, instead of a converging light flux described above, a parallel light flux is used as the reference light beam Lr in the exposure process in the production of the hologram recording medium 55. The hologram recording medium 55 described above can be more simply produced and replicated.

(Optical Device)

In the embodiment described above, although the example in which the optical device 50 is configured with a reflection-type volume hologram recording medium 55 using photopolymer has been described, the present invention is not limited thereto. As already explained, the optical device 50 may include a plurality of hologram recording media 55. Moreover, the optical device 50 may include a volume hologram recording medium that is a type in which recording is performed by using a photosensitive medium including a silver halide material. Moreover, the optical device 50 may include a transmission-type volume hologram recording medium or a relief-type, i.e. emboss-type hologram recording medium.

With respect to the relief-type, i.e. emboss-type, hologram recording medium, a hologram interference fringe is recorded using a convex-concave structure of the surface thereof. However, in the case of the relief-type hologram recording medium, scattering due to the convex-concave structure of the surface may also cause generation of new speckles, hence in this respect, the volume hologram recording medium is preferable. In the case of the volume hologram recording medium, a hologram interference fringe is recorded as a refractive index modulation pattern, i.e. refractive index distribution, of an inner portion of the medium, hence there is no influence of scattering because of the convex-concave structure of the surface.

However, even when the volume hologram recording medium is used, a type in which recording is performed using a photosensitive medium including a silver halide material may become a cause of generating new speckles due to scattering of silver halide particles. In this respect, the volume hologram recording medium using a photopolymer is preferable as the hologram recording medium 55.

Moreover, in the exposure process shown in FIG. 3, although a so-called Fresnel-type hologram recording medium is produced, a Fourier transform-type hologram recording medium which can be obtained through recording using lenses may be produced. When the Fourier transform-type hologram recording medium is used, lenses can also be used for image reproduction.

In addition, a striped pattern, i.e. refractive index modulation pattern or convex-concave pattern, which is to be formed on the hologram recording medium 55 may be designed by using a computer based on a planned wavelength or incidence direction of a reproduction illumination light beam La, a shape or position of an image to be reproduced, and the like, without use of an actual object light beam Lo and reference light beam Lr. The hologram recording medium 55 obtained in this manner is called a computer generated hologram recording medium. Moreover, when a plurality of coherent light beams having mutually different wavelength ranges are emitted from the irradiation device 60 in a similar manner in the modification described above, the hologram recording medium 55 as a computer generated hologram recording medium may be partitioned two-dimensionally into a plurality of regions provided corresponding to coherent light beams of respective wavelength ranges so that the coherent light beams of the respective wavelength ranges are diffracted in the corresponding regions to reproduce images.

Moreover, in the embodiments described above, although the example is described in which the optical device 50 includes the hologram recording medium 55 by which coherent light beams emitted to respective positions thereof are spread to illuminate the entire region of the illumination region LZ, the present invention is not limited thereto. Instead of the hologram recording medium 55 or in addition to the hologram recording medium 55, the optical device 50 may include a lens array as an optical device by which the propagation directions of coherent light beams incident on respective positions thereof are changed and the coherent light beams are diffused to illuminate the entire region of the illumination region LZ. As a concrete example of the lens array, a total reflection-type or refraction-type Fresnel screen having a diffusing function, a fly-eye lens, and the like may be exemplified. In this type of illumination device 40, the irradiation device 60 and the optical device 50 may be configured so that the irradiation device 60 emits coherent light beams to the optical device 50 so that the coherent light beams scan the lens array and the coherent light beams incident on respective positions of the optical device 50 from the irradiation device 60 undergo change in the propagation directions by the lens array to illuminate the illumination region LZ, thus effectively making speckles inconspicuous.

In more concretely, in the case of the present embodiment, it is required to provide a lens array that includes at least three lenses corresponding to the laser sources 61, respectively. On each lens, a coherent light beam is incident that is emitted from the corresponding laser source 61 and then reflected by the scanning device 65. Then, through each lens, an incident light beam is diffused to illuminate the entire region of the illumination zone LZ. With this configuration, even if the hologram recording medium 55 is not provided, the entire region of the illumination zone LZ can be illuminated with the same color as the laser sources 61.

(Illuminating Method)

In the embodiments described above, an example is shown in which the irradiation device 60 is configured to be able to scan the optical device 50 in a one-dimensional direction with coherent light beams and the hologram recording medium 55 or the lens array of the optical device 50 is configured to diffuse, i.e. spread and diverge the coherent light beams incident on respective positions of the hologram recording medium 55 in a two-dimensional direction, so that the illumination device 40 illuminates the two-dimensional illumination region LZ. However, as described above, the present invention is not limited to such example. For example, the irradiation device 60 may be configured to be able to scan the optical device 50 in a two dimensional direction with coherent light beams and the hologram recording medium 55 or the lens array of the optical device 50 may be configured to diffuse, i.e. spread and diverge, the coherent light beams incident on respective positions of the hologram recording medium 55 in a two-dimensional direction, so that the illumination device 40 illuminates the two-dimensional illumination region LZ, as shown in FIG. 12.

Moreover, as already described, the irradiation device 60 may be configured to be able to scan the optical device 50 in a one-dimensional direction with coherent light beams and the hologram recording medium 55 or the lens array of the optical device 50 may be configured to diffuse, i.e. spread and diverge, the coherent light beams incident on respective positions of the hologram recording medium 55 in a one-dimensional direction, so that the illumination device 40 illuminates the one-dimensional illumination region LZ. In this configuration, the scanning direction of a coherent light beam from the irradiation unit 60 and the diffusing direction, i.e. spreading direction, by the hologram recording medium 55 or the lens array of the optical device may be parallel with each other.

Furthermore, the irradiation device 60 may be configured to be able to scan the optical device 50 in a one- or two-dimensional direction with coherent light beams and the hologram recording medium 55 or the lens array of the optical device 50 may be configured to diffuse, i.e. spread and diverge, the coherent light beams incident on respective positions of the hologram recording medium 55 in a one-dimensional direction. In this configuration, as already described, the optical device 50 may have a plurality of hologram recording media 55 or lens arrays to illuminate illumination zones LZ corresponding to the hologram recording media 55 or lens arrays successively, so that illumination device 40 illuminates a two-dimensional region. In this occasion, the illumination zones LZ may be successively illuminated at a speed felt like as if simultaneously illuminated for human eyes or at a low speed so that human eyes can recognize that the illumination zones LZ are successively illuminated.

The present invention is not limited to the embodiments described above but includes various modifications conceivable by those skilled in the art. The effects of the present invention are also not limited to those described above. Namely, various additions, modifications and partial omissions may be made without departing from the conceptual idea and gist of present invention derived from those defined in the accompanying claims and their equivalents.

The invention claimed is:

1. An illumination device comprising:
   an optical device including a hologram recording medium capable of reproducing an image of a reference member on an illumination zone, the optical device varying an incidence angle of the coherent light beam at each position on the illumination zone with time; and
   an irradiation unit configured to irradiate a coherent light beam to the optical device so that the coherent light beam scans the hologram recording medium,
   wherein the irradiation unit comprises:
   a light source configured to emit a coherent light beam, the light source comprising a plurality of light sources configured to emit a plurality of coherent light beams having an identical wavelength range; and
   a scanning device comprising a reflection device which reflects the plurality of coherent light beams emitted from the plurality of light sources while changing a reflection direction of each of the plurality of coherent light beams within a predetermined range to scan a recording area of the hologram recording medium,
   wherein the hologram recording medium comprises the recording area to be scanned with each of a plurality of coherent light beams reflected by the scanning device, and
   the recording area comprises an interference fringe that diffracts an incident coherent light beam, each of the plurality of coherent light beams scans a corresponding partial area in the recording area, and the plurality of coherent light beams diffracted by the interference fringe of each partial area in the recording area is superimposed on at least one portion of the illumination zone to reproduce the image of the reference member.

2. The illumination device of claim 1, wherein the plurality of coherent light beams emitted from the plurality of light sources are emitted to an identical point on the scanning device.

3. The illumination device of claim 2, wherein a plurality of coherent light beams reflected at the identical point on the scanning device are incident on the hologram recording medium as diffused light beams.

4. The illumination device of claim 2, wherein the plurality of light sources emit a plurality of coherent light beams having the identical wavelength range in roughly parallel directions, wherein the irradiation unit further comprises a converged-beam generator configured to irradiate the identical point of the scanning device with the plurality of coherent light beams emitted in the roughly parallel directions from the plurality of light sources.

5. The illumination device of claim 1, wherein the plurality of coherent light beams emitted from the plurality of light sources and incident on the scanning device are parallel beams.

6. The illumination device of claim 5, wherein the plurality of coherent light beams incident on the scanning device from the plurality of light sources in the roughly parallel directions are reflected by the scanning device and incident on the hologram recording medium as a diverging light.

7. The illumination device of claim 2 further comprising a parallel-beam generator configured to convert the coherent light beams reflected and diffused at the identical point on the scanning device into parallel beams to be incident on the hologram recording medium.

8. The illumination device of claim 1, wherein the light source comprises a laser array comprising the plurality of laser sources arranged adjacent to one another, wherein each of a plurality of coherent light beams from the plurality of laser sources in the laser array scans on the recording area.

9. A projection apparatus comprising:

the illumination device of claim 1; and a spatial light modulator that is provided at a location overlapped with the predetermined area reproducing the image of the scattering plate and illuminated by the illumination device.

10. The projection apparatus of claim 9 further comprising a projection optical system configured to project a modulated image generated in the spatial light modulator on a screen.

11. A projection apparatus comprising:

the illumination device of claim 1;

a spatial light modulator that is provided at a location overlapped with the predetermined area reproducing the image of the scattering plate and illuminated by the illumination device; and a projection optical system configured to project a modulated image generated in the spatial light modulator on a screen, wherein the projection optical system is provided at a location on which zero-order light is not incident, the zero-order light being included among coherent light beams that are reflected by or pass through the hologram recording medium.

12. A projection-type image display apparatus comprising:

the projection apparatus of claim 10; and a screen that projects a modulated image generated in the spatial light modulator.

* * * * *